UNITED STATES PATENT OFFICE.

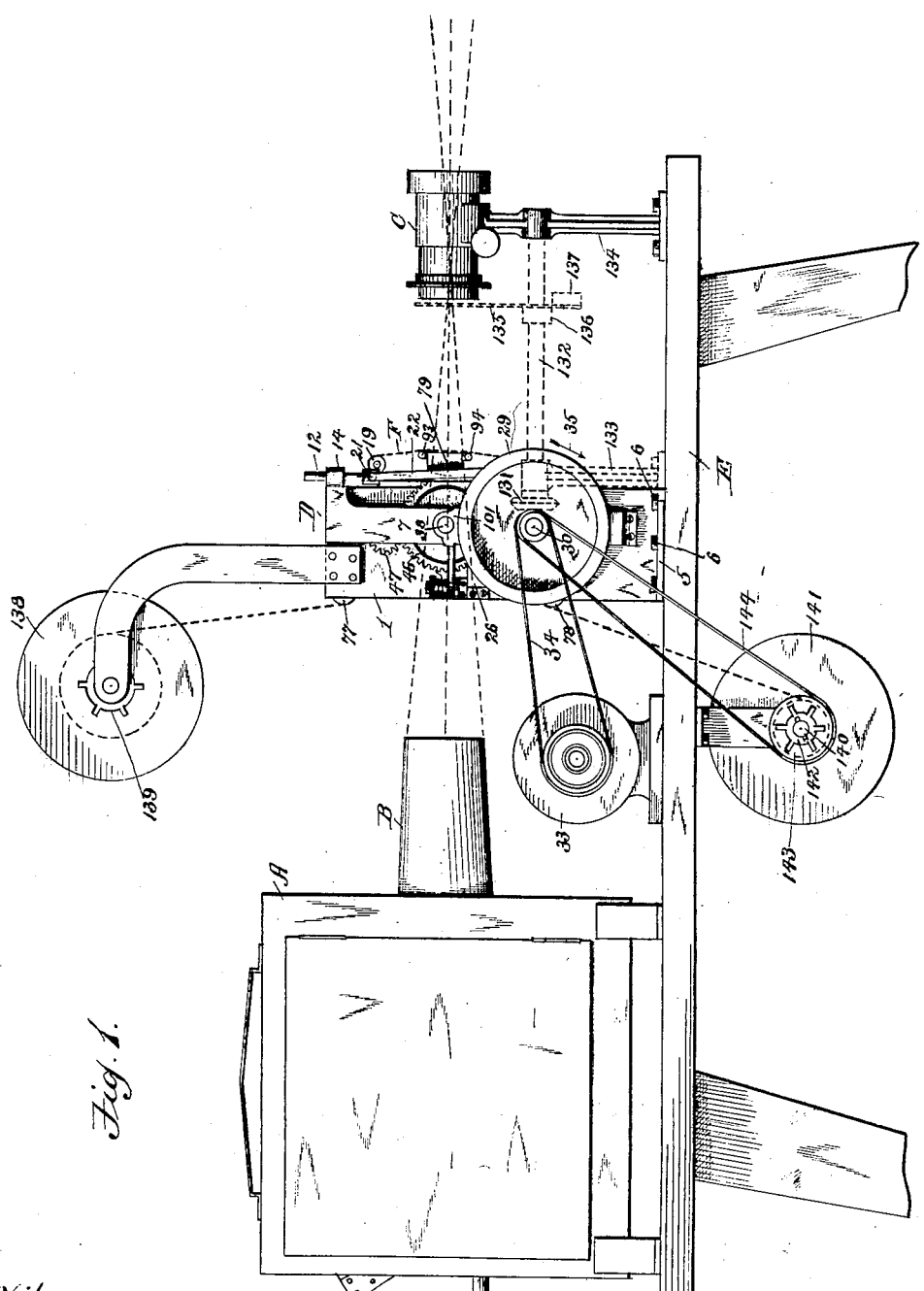

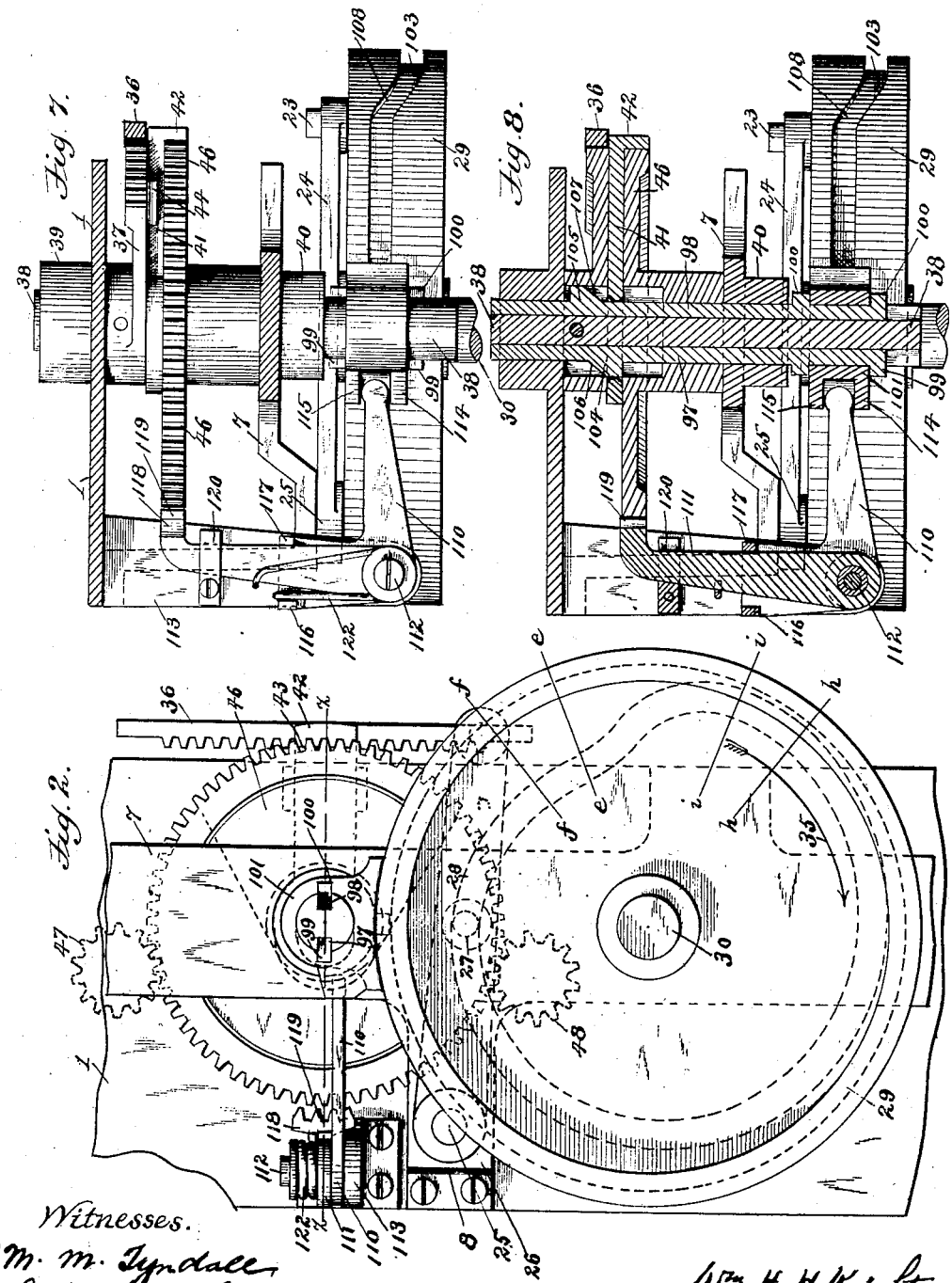

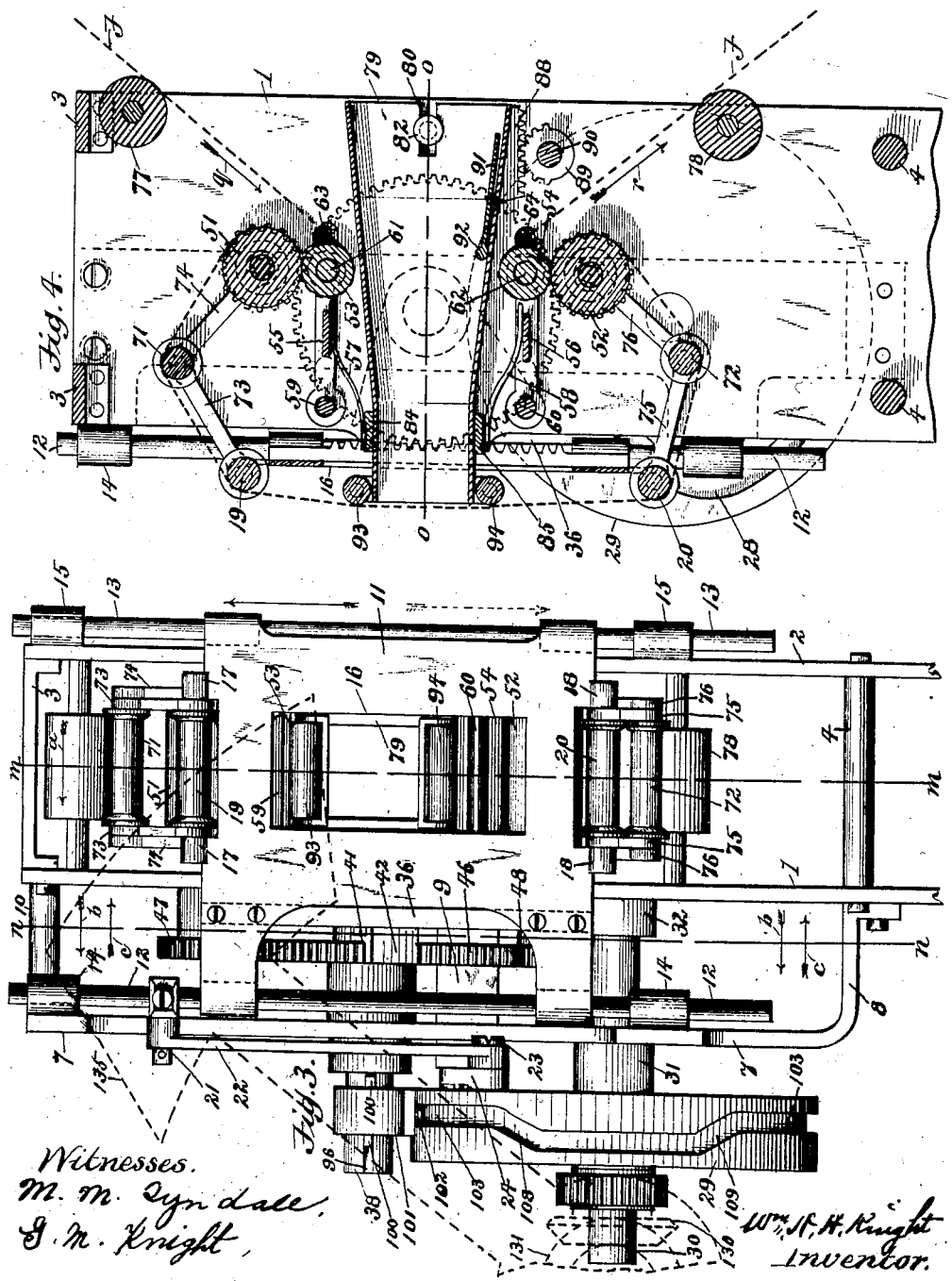

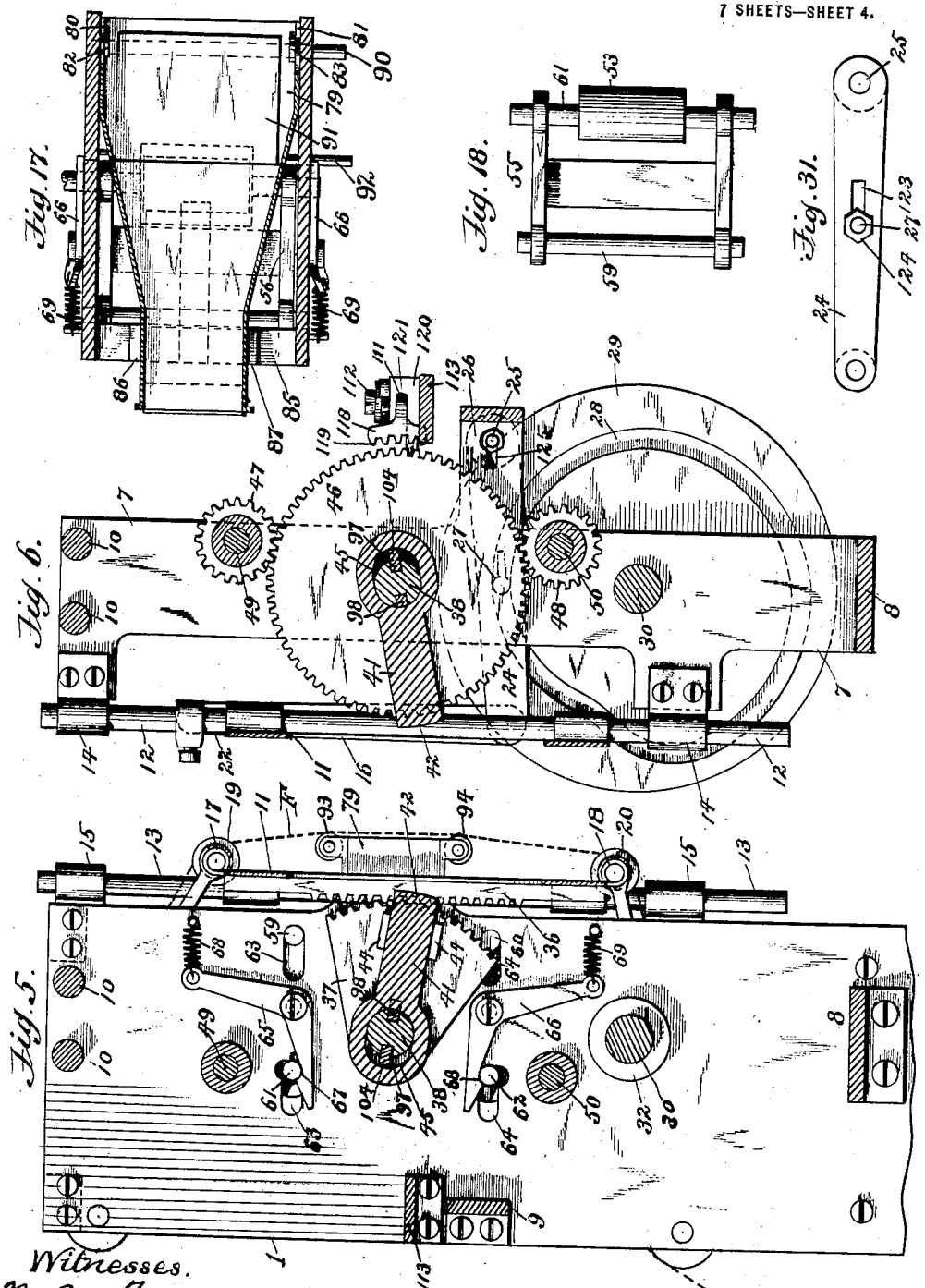

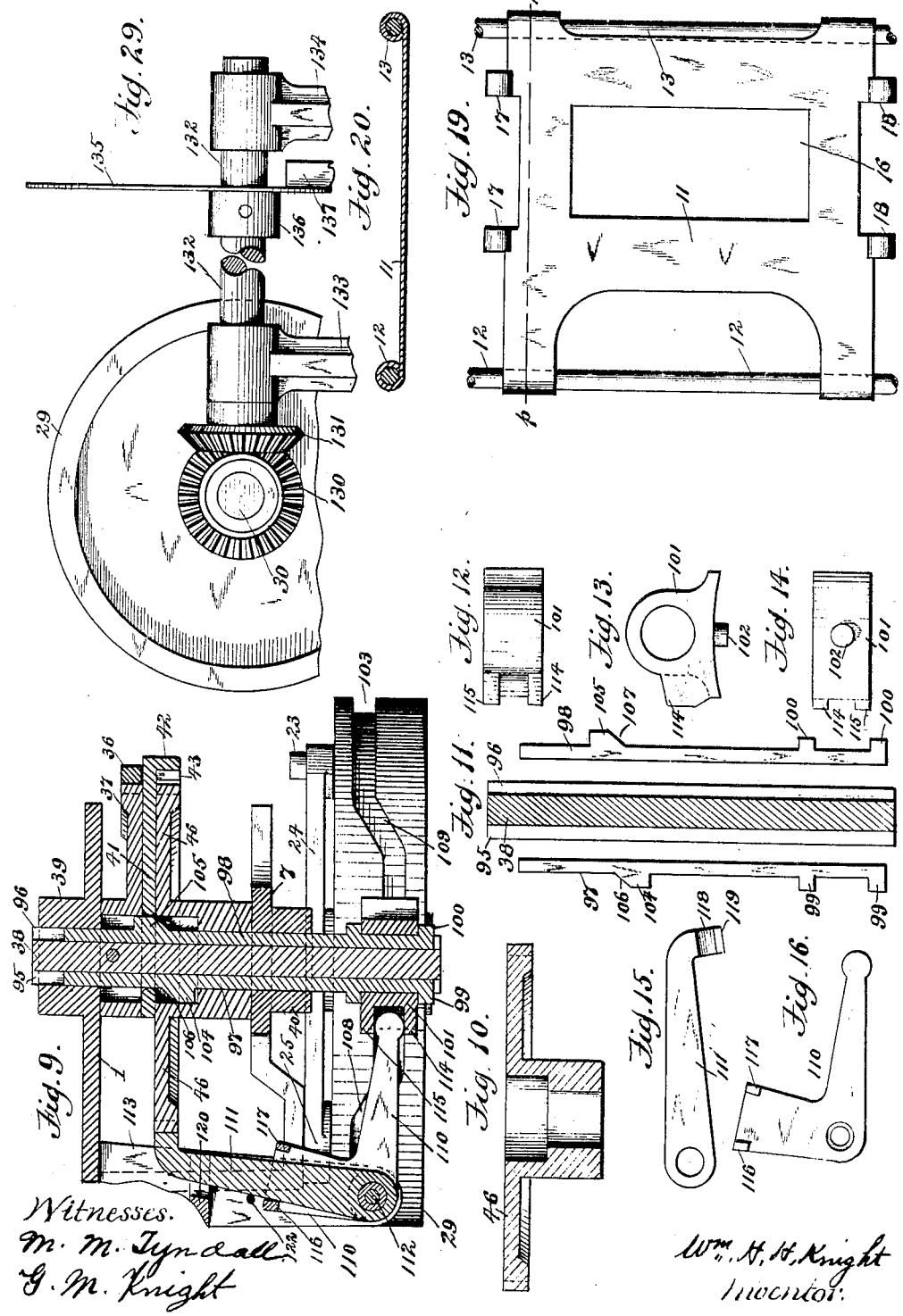

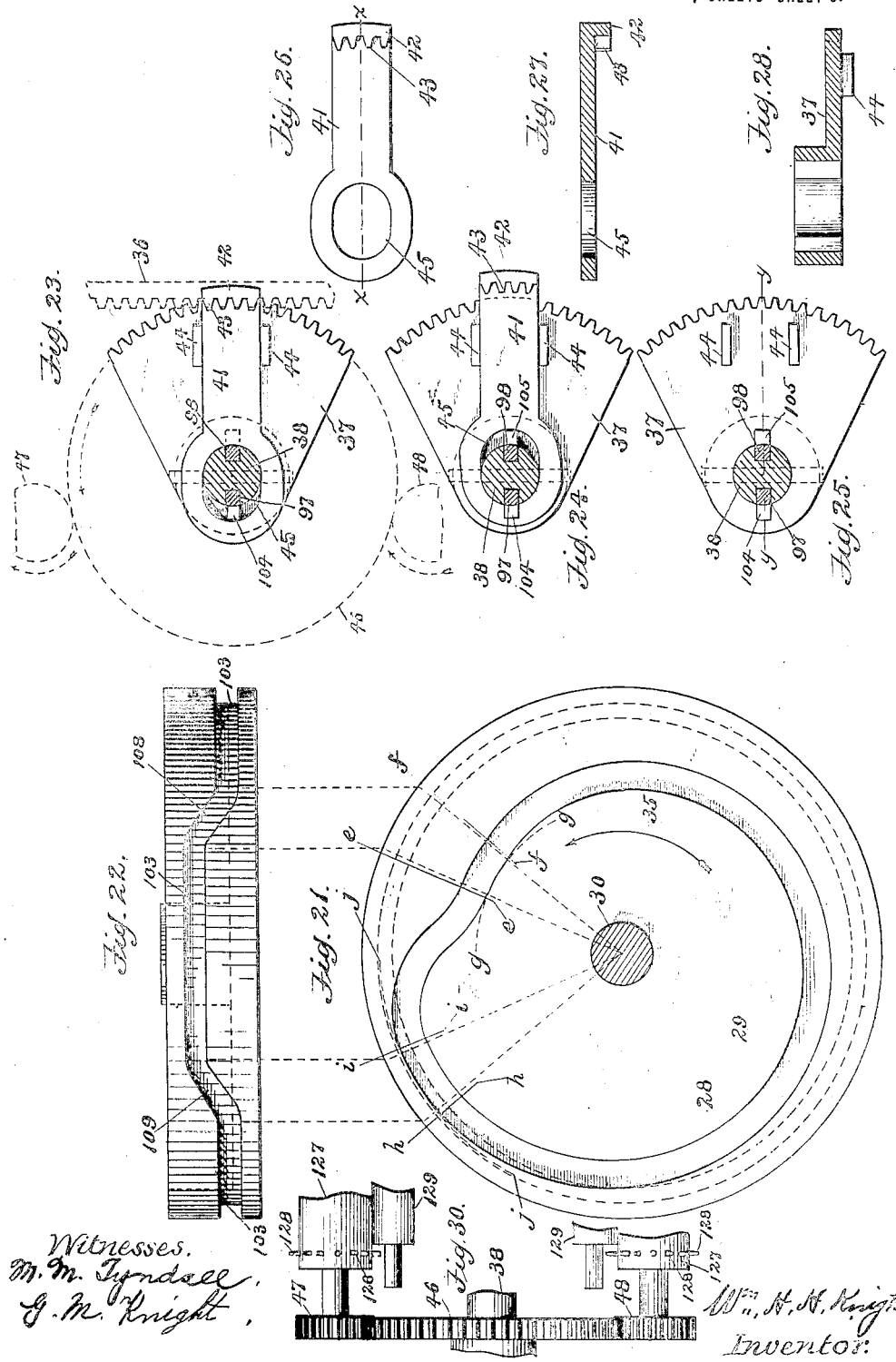

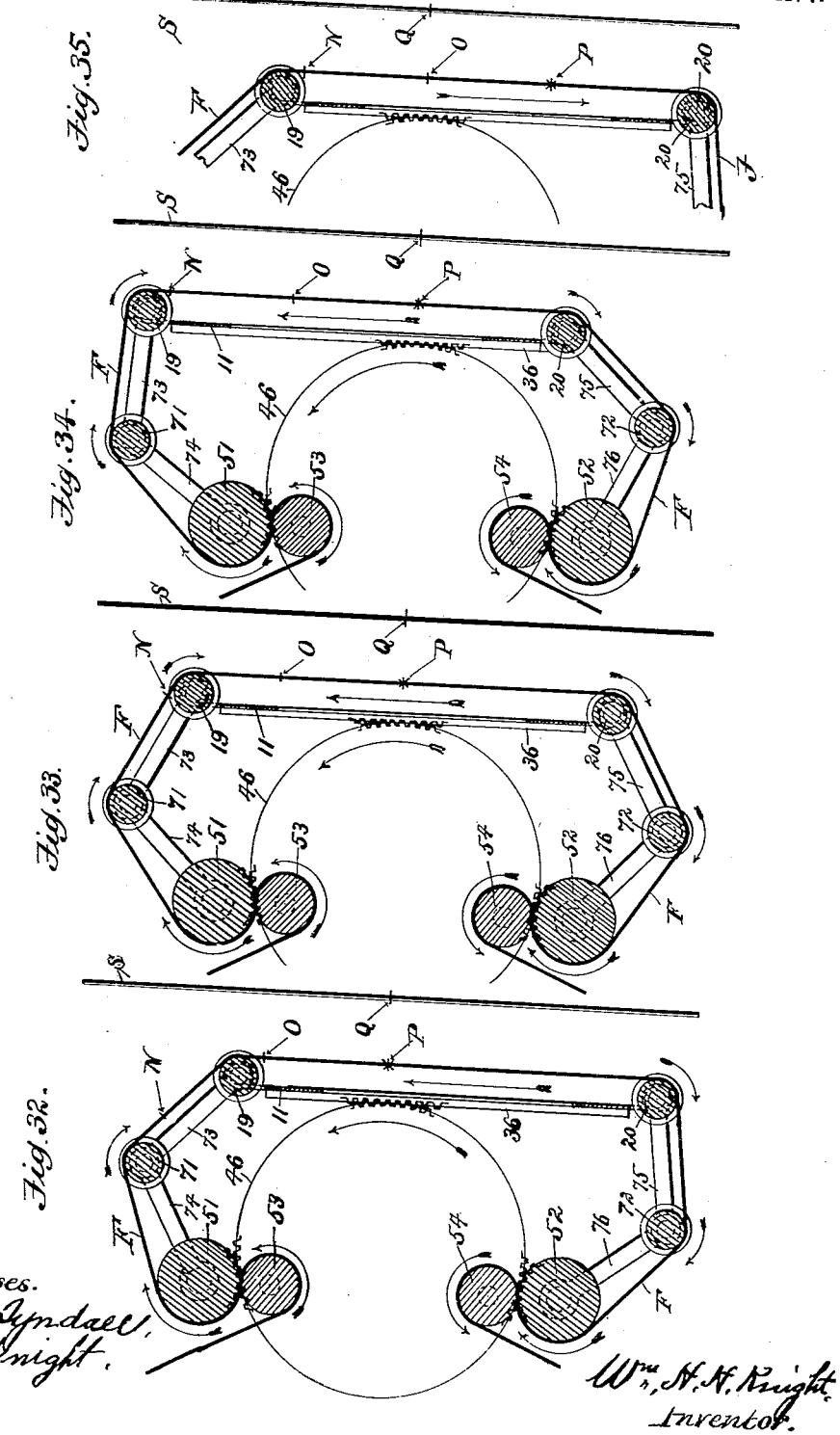

WILLIAM H. H. KNIGHT, OF PHILADELPHIA, PENNSYLVANIA.

MOTION-PICTURE MACHINE.

1,205,548.  Specification of Letters Patent. Patented Nov. 21, 1916.

Application filed April 2, 1912, Serial No. 688,050. Renewed April 7, 1916. Serial No. 89,722.

*To all whom it may concern:*

Be it known that I, WILLIAM H. H. KNIGHT, a citizen of the United States of America, residing at 2647 North Thirty-third street, Philadelphia, in the county of Philadelphia and State of Pennsylvania, have invented certain new and useful Improvements in Motion-Picture Machines, of which the following is a specification.

The present invention while broadly relating to that class which comprises devices, commonly known as motion picture machines, and which have for their object the exhibition of pictures arranged, equi-distant from each other, upon a band or film of transparent, or of translucent material, in such a manner as to produce the appearance of animate, or inanimate objects in motion, yet more particularly has for its object the provision, in a device of the class named, of efficient means whereby a series of pictures photographic or otherwise, showing in proper sequence the successive motions or movements of an object, either animate, or inanimate, are so displayed as to present to the eye of an observer, a perfect reproduction of such motions or movements with lifelike accuracy and effect.

The invention further contemplates the provision, in a device of the class named, of peculiar means connected to move the picture bearing surface, band, or film of such device during the period of exposure of each successive picture thereupon, and while so moving said picture bearing surface, band, or film to positively maintain each successive picture thereon at a predetermined point between the source of its illumination and a selected spot upon a stationary picture receiving surface.

The invention further contemplates the provision, in a device of the class named, of means connected to instantaneously substitute each successive picture for that which immediately precedes it, at a predetermined point between the source of illumination of such picture and a selected spot upon a stationary picture receiving surface, without increase of strain or tension to the picture carrying surface, without the employment of a shutter, or its equivalent during such substitution of picture for picture, and in such manner as to render such substitution absolutely invisible to the eye. And finally the invention consists in the construction, arrangement and combination of the several parts comprised therein for service, substantially as is hereinafter described, and illustrated in the accompanying drawings, wherein:

Figure 1, is a side elevation of a motion picture machine constructed in accordance with my invention. Fig. 2, is a side elevation of a part of the main operative elements of the device, enlarged to clearly show the parts illustrated therein. Fig. 3, is a front elevation of the main operative portion, or body of the machine removed from the base, and remaining parts of the machine. Fig. 4, is a vertical section of the body portion of the machine, taken on the line $m, m,$ of Fig. 3, and looking in the direction indicated by the arrow $a$ on said Fig. 3. Fig. 5, is a vertical section of said body portion of the machine, taken on the line $n, n,$ of Fig. 3, looking in the direction indicated by the arrows $c, c,$ such view illustrating, in side elevation, a part of said body otherwise hidden from view. Fig. 6, is a vertical sectional view taken on said line $n, n,$ of Fig. 3, and looking in the direction of the arrows $b, b,$ such view illustrating, in elevation, the disposition of the main operative elements of the device with relation to the parts operated thereby. Fig. 7, is a top plan view of that part of the machine that is illustrated in Fig. 2. Fig. 8, is a transverse sectional view taken on the line $z, z,$ of Fig. 2, through those parts of said Fig. 2, which are shown, in plan view, in Fig. 7 to clearly illustrate the means by which the gear locking mechanism, shown in Fig. 7 is operated, in one position. Fig. 9 is a transverse sectional view like unto that illustrated in Fig. 8, and taken upon the line $z, z,$ of Fig. 2, as in said Fig. 8, to show the devices by which the gear locking mechanism is actuated in different position from that shown in Fig. 8. Fig. 10, is a transverse sectional view, taken through the master gear wheel which actuates the rolls by which the picture bearing band, or film is moved to show clearly the construction of the hub of said wheel. Fig. 11, sets forth, in longitudinal section, the shaft upon which the master gear wheel, illustrated in Figs. 7, 8, and 9, is mounted, and also at each side thereof, a spline which is provided with a device to operate the locking mechanism by which the master gear wheel is held from rotation, or caused to rotate in unison with parts of the mechanism, as will be described hereinafter. Figs. 12, 13, and 14, illustrate respectively a top plan view, a side elevation, and a bottom plan view of a block which, mounted upon the shaft upon which the master gear wheel is mounted, is moved to operate the mechanism which throws the master gear wheel into, or out of operative engagement with the film carrier. Figs. 15, and 16, illustrate the separate members of the compound locking lever which holds the master gear wheel from rotation. Fig. 17, is a transverse sectional view taken on the line o, o, of Fig. 4, through the body of the machine, to more clearly illustrate the movable tube which conducts the rays of light to the picture as hereinafter set forth. Fig. 18, illustrates a tension roll detached from the machine, to more clearly show the manner in which it is supported. Fig. 19, illustrates, in front elevation, the movable film carrier, detached from the machine, to more clearly illustrate the construction of the same. Fig. 20, is a transverse sectional view of the film carrier, taken on the line p, p, of Fig. 19. Fig. 21, illustrates in side elevation, the actuating cam wheel by which the operative parts of the machine, are moved. Fig. 22, illustrates an edge view of the cam wheel shown in Fig. 21. Figs. 23, to 25 inclusive illustrate, in elevation, the gear segment which, actuated by the movable film carrier, imparts movement to the master gear wheel and its connected film moving rolls, and said figures show further the locking mechanisms by which said segment is secured to the master gear wheel. Fig. 26, shows in front elevation, the device which connects the gear segment illustrated in Fig. 23, to 25, in operative connection with the master gear wheel, when said wheel is to be actuated. Fig. 27, is a longitudinal section of the locking device shown in Fig. 26, on the line x, x, of said Fig. 26. Fig. 28, is a longitudinal section of the gear segment illustrated in Figs. 23, to 25, taken on the line y, y, of Fig. 25. Fig. 29, illustrates, in a detached detail view, one method of operating a shutter from the main actuating cam wheel, when the machine is to be used as a camera. Fig. 30, illustrates in a detached detail view one method of feeding the picture containing film forward to, and upon the movable film carrier. Fig. 31, is a detached detail view of the cam actuated lever through which movement is imparted to the film carrier, showing said lever provided with adjustable means for increasing the length of movement up, and down, of the film carrier. Figs. 32. to 35, inclusive, are diagrammatic views illustrating the relative movements of the movable film carrier, and the film carried thereby, during the period of exposure of a picture upon said film, and the period of displacement of said picture and substitution of another in its stead.

Similar letters and numerals of reference in the several figures of the drawings, denote similar parts.

Heretofore in machines that have been devised, both for the purpose of taking photographic pictures of animate, or inanimate objects in motion, or for the purpose of exhibiting such pictures so as to reproduce the exact movements of the objects so photographed, upon a stationary picture receiving surface with lifelike fidelity, two distinct types of machines have been employed, each thereof, while using in common with the other, a tape like band, or film upon which the pictures are disposed in proper sequence, as the medium whereby such pictures are successively brought to a particular point between the source of illumination and a selected spot upon the picture receiving surface, yet operates in a manner peculiar to the type to which it appertains, to move such band, or film, for instance, in one type of the machines noted, the picture carrying band, or film is maintained in continuous motion, at a pre-determined speed, with the result that the successive pictures upon said band or film, are caused to rapidly pass between the source of illumination and the stationary picture receiving surface, and inasmuch as the reflection, or image of each successive picture is, at such time, thrown upon said picture receiving surface, it will be readily apparent that the effect produced upon the eye of an observer by the rapid passage of the pictures across such surface, would be simply that of a blur, so pronounced as to render the pictures indistinguishable each from the other, were it not for the employment in connection with the continuously moving picture carrying band, or film described, of means for alternately covering and exposing the pictures at regular intervals, such means preferably consisting in a revolving disk, or shutter having one or more openings formed therethrough near its periphery and so timed, as to its rotation, that one of said openings, and a picture upon the band or film shall simultaneously reach a predetermined point between the source of illumination and a selected spot upon the picture receiving surface, at which time only, will the reflection, or image of the picture be thrown, through the opening in the disk or shutter, upon said picture receiving surface.

As stated the shutter is preferably in the form of a disk having one, or more openings therethrough, near its periphery, it will therefore be readily understood that the distance between the openings noted, will be many times greater than the distance across such openings, and that consequently the time interval between the exposure of successive pictures upon the picture receiving surface, determined as it is by the rotation of the disk or shutter, will be many times greater than the time interval of such exposure, and inasmuch as the passage of light from the source of illumination to the picture receiving surface, is during the time interval between the exposure of such pictures, wholly obstructed by the disk or shutter, it will be apparent that the period of darkness due to such obstruction, will be impressed upon the eye of an observer to a greater extent than is the period of exposure of the picture, with the result that the picture will appear to be blurred indistinct, and poorly lighted.

From the foregoing it will be noted that the blurred, indistinct, and poorly lighted appearance of the picture, when shown by a machine of the type described, is directly due to the combined action of the continuously moving picture, and the revolving disk, or shutter as set forth.

In the remaining type of machine noted, the tape like picture bearing band, or film, is moved forward by successive impulses, at recurrent equi-timed periods, to a distance which preferably corresponds to the distance across the picture which is to be moved, such forward movement taking place between the periods of exposure, and brought about through intermittingly acting mechanism of different descriptions, as for instance, by rotatable eccentrics which in turning bear upon one surface of the band, or film, and thus operate to draw it forward, or by spring, or mutilated gear actuated devices connected to rotate toothed wheels which coact with apertures in the band, or film to move the same, or in other ways not necessary to name herein but which, in common with those noted operate to draw the band, or film forward by sudden impulses or jerks thereupon between the intervals of exposure of the pictures thereon as noted.

In contradistinction to the devices hereinbefore referred to, the invention which forms the subject-matter of the present application contemplates the provision of a machine which, while employing a picture bearing band, or film like unto those employed in the devices noted, is yet so peculiarly constructed, and arranged as regards its operative mechanism, as to move said band, or film forward a distance equal to the distance across a picture, during the time interval of the exposure of each successive picture thereupon, and while so moving said pictures, to maintain each thereof at a predetermined point between the source of illumination and a selected spot upon the picture receiving surface, and to maintain the image, or reflection of such picture absolutely stationary upon said picture receiving surface at such selected spot, and further to instantaneously substitute picture for picture during the time interval between the exposure of such pictures, without subjecting the picture carrying surface, band, or film to the slightest forward strain, impulse or jerk, because of which attributes, noted as peculiar to this invention, the speed with which substitution of picture for picture is accomplished, can be made to far exceed that heretofore attainable in this art, and the use of a shutter of any type in connection with such substitution, rendered absolutely unnecessary, while at the same time, the period, or time limit of exposure of each picture can be correspondingly increased.

While different combinations of mechanism may be employed to carry the invention outlined in the foregoing statements into practice, I will yet describe but one, that illustrated in the accompanying drawings, in which Fig. 1, shows, in a general view, the several devices which are essential in a machine of the class to which my invention appertains, and the arrangement of such devices, with the particular device which embodies my invention. In the said Fig. 1, A, designates the casing, or box within which the illuminating device, of whatever preferred type desired, is housed, and such casing may be constructed of any desired material suitable to the end sought, and in any form, either similar to or different from that illustrated, B, designates a casing which, projecting from the casing A, contains the condenser lens, C designates the objective lens, D designates the device which forms the subject matter of this application, and E, designates the support, or stand upon which the several devices named are mounted.

So far as described the arrangement of the devices noted, are similar to those of like character, in machines of this class already in use, such arrangement having been found by practice to be the most suitable to attain the desired end, that of concentrating rays of light from a source of illumination upon a picture located between a condenser lens, and an objective lens for the purpose of casting a magnified reflection, or image of said picture upon a stationary picture receiving surface, and having so described the several main devices comprised in the complete machine, I will now specifically describe the particular construction, arrangement and combination of the several elements comprised in the present embodiment of my invention, and the operation of the same to the desired end.

In carrying my invention into practice I provide a suitable support, or frame which may be formed in any desired manner, but which, in the present instance, consists in plates 1 and 2, held parallel with each other, and at suitable distances apart by struts 3, and 4, to which they are secured, and provided at their lower ends with flanges 5, apertured for the passage of screws 6, by which they are secured to the support E. I provide the frame with an additional member 7, held parallel with the plate 1, by inwardly projecting portions 8, and 9, and struts 10, and preferably secure said member 7, and plate 1, together by screws as shown.

As hereinbefore stated my invention contemplates the forward movement of the picture bearing band or film during the interval of exposure of the pictures thereupon, and to this end I employ, as the principal factor to such end, a reciprocating film supporting carrier 11, having its opposite side edges provided with rods 12, and 13, which, arranged parallel with each other, freely move up, and down in bearings 14, 14, and 15, 15, which are respectively secured to the members 7, and 2 of the frame as shown. See Fig. 3.

I preferably construct the band, or film supporting carrier 11, of sheet metal, and in a single piece, see Figs. 19, and 20, and provide such carrier with an elongated rectangular shaped opening 16, for a purpose presently to be explained, and, at its upper and lower side edges respectively with journal bearings 17, 17, and 18, 18, to receive the journals of rolls 19, and 20, which support the band, or film upon the carrier as will presently be explained.

It is to be understood that the successful operation of my invention depends wholly upon the ability of such invention to conform to two distinct characteristics of the eye, one, that peculiar property which enables it to retain the impression of an object, for a period of time after the object itself has been removed from sight, the other, the inability of the eye to receive the impression of any movement which exceeds a certain speed, and inasmuch as the movement of the carrier 11, both determines and controls the movement of the picture bearing band, or film, as will be hereinafter fully explained, it will be clearly apparent that such movement of said carrier 11, must be so timed as to insure, first, the impression of a perfect image of each picture, on such band, or film, upon the eye during the exposure of such picture, and secondly, the change or substitution of picture for picture, with such a degree of speed, that such change or substitution is effected while the impression of the picture so withdrawn, is yet retained by the eye.

To the accomplishment of the ends above noted I provide that the upward and downward movements of the carrier 11, shall be different, each from the other, and that of such movements, the upward shall have the slowest motion, and shall determine the time limit of exposure of the picture, while the opposite downward movement, having quicker motion, shall determine the time limit of the substitution of picture for picture, to which end, I provide the rod 12, of the carrier 11, with a projecting stud 21, which, preferably adjustably upon said rod, as shown, engages one end of a connecting rod 22, the opposite end of which, is engaged by a stud 23, upon the outer end of a lever 24, which pivoted at 25, to a rearwardly projecting part 26, of the member 7, of the frame, is operated to move the carrier up, and down, through the medium of a stud 27, which disposed between the opposite ends of the lever 24, is engaged by a cam shaped groove 28, (into which it extends), upon one face of a wheel 29, which mounted upon a shaft 30, journaled in bearings, 31, and 32, upon the member 7, and plate 1, respectively, of the frame, is rotated by a motor 33, through a belt 34, see Figs. 1, 2, and 6, in the direction indicated by the arrows 35, see Figs. 2, and 21, each revolution thereof operating, as will be readily apparent, to move the carrier 11, up and down.

By reference to Fig. 21, it will be observed that the portion of the groove 28, which is included between the full radial lines $e, e$, and $f, f$, is concentric with the center of the wheel, as is clearly shown by the line $g, g$, drawn concentric with such center, that the trend of said groove about the wheel, from the line $f, f$, to the line $h, h$, is outward from the center of said wheel; that the portion of the groove included between the lines $h, h$, and $i, i$, is concentric with the center of the wheel as is shown by the line $j, j$, drawn concentric with such center; and that the trend of the groove from the line $i, i$, to the line $e, e$, is inward toward the center of the wheel, in connection with Fig. 21, see also Fig. 2. Further, reference to said Fig. 21, will clearly indicate the relation of the time limit of exposure of a picture, to the time limit of the withdrawal of such picture and the substitution of another therefor, for it will be readily apparent that such relation is determined wholly by the difference in length, between that portion of the groove 28, which has an outward inclination, or trend, and that portion of such groove which has an inward inclination, or trend, which difference, in the present instance, compares as seven to one, or in other words, the period, or time limit of exposure of a picture, is seven times as long as is the period, or time limit of the withdrawal of such picture, and the substitution of another therefor.

I provide that the movement of the carrier 11, shall wholly determine and control the movement of the picture bearing band, or film, both during the time limit of exposure of a picture upon such band, or film, at which time said band, or film moves upon the carrier 11, itself, in direction opposite that in which the carrier is moving, as will be presently explained, and also during the time limit of the withdrawal of such picture, and the substitution of another therefor, at which time the band, or film does not move upon the carrier, but is carried forward thereby, and to such ends I secure a rack bar 36, to the carrier 11, to engage with a gear segment 37, which, rigidly mounted upon a shaft 38, is moved up, and down in unison with the carrier 11.

As has been stated, the gear segment 37, engages with and is moved by the rack bar 36, which is rigid with the carrier 11, it will therefore be understood that the pitch lines of said rack bar, and segment will coincide each, with the other, and that therefore the periphery of the segment, and the rack bar, or carrier to which said bar is connected, will move a like distance.

The shaft 38, is journaled in bearings 39, and 40, formed upon the members 1, and 7, respectively of the frame and upon said shaft I mount one end of a locking plate, or bar 41, which extends thence, in contact with, and centrally disposed upon the gear segment 37, outwardly beyond the periphery of said segment, and is, at its outer end provided upon one side with a projecting portion 42, having internal gear teeth 43, thereon for a purpose presently to be explained.

The locking bar 41, is held from lateral movement upon the segment 37, by lugs 44, which project from such segment to contact lightly with the opposite sides of said bar, see Figs. 23, and 24. I elongate the aperture 45, formed through the bar 41, for the passage of the shaft 38, so as to permit longitudinal movement of said bar, by means which will be hereinafter explained, to move the gear teeth 43, thereon, into and out of contact with the teeth upon a gear wheel 46, which, mounted to turn upon the shaft 38, and bearing lightly against the locking bar 41, is of like radius, and pitch, as regards its gear teeth, to the segment 37, see Figs. 2 and 7.

It is to be understood that the peculiar function of the gear wheel 46, is to impart movement to the rollers by which the picture bearing band, or film F, is moved forward to, and upon the carrier 11, and to this end I provide that said gear wheel shall engage with, and rotate pinions 47, and 48, which, arranged at opposite sides of the gear wheel 46, and preferably equi-distant from the front of the machine, are respectively mounted upon, and rigid with shafts 49, and 50, which extending from side to side of the machine, and journaled in the members 1, and 2, of the frame thereof, are provided respectively with rollers 51, and 52, by which the picture bearing band, or film is moved.

I preferably make the diameter of the rollers 51, and 52, exactly equal, with the diameter of the pitch line of each of the pinions 47, and 48, which, moved by the gear wheel 46, turn said rollers, and since said gear wheel is of like radius, and pitch to the segment 37, and is moved thereby, it will be apparent that the band, or film will be moved by the rollers a distance exactly equal to that moved by the carrier 11, from which said gear wheel receives movement. For the purpose of increasing friction between the surface of said rollers 51, and 52 and the band, or film carried thereby, I provide pressure rolls 53, and 54, which bear upon, and hold said band, or film in close contact with the rollers 51, and 52. The pressure rolls 53, and 54, are mounted in swinging frames 55, and 56, and held in close contact with the band, or film F, and its supporting rollers 51, and 52, by leaf springs 57, and 58, which project from a part of the frame as shown.

I provide that the pressure rolls 53, and 54, for the purpose of adjusting the band, or film thereon, may be moved backward away from the rollers 51, and 52, and also may be locked against accidental displacement when in position for use, to which ends, the outer ends of each of the rods 59, and 60, which form a part of the swinging frames 55, and 56, and also the ends of the shafts 61, and 62, upon which the pressure rolls are mounted, project outwardly through the slots 63, and 64, which are formed through the plates 1, and 2, see Fig. 5. To lock the swinging frames 55, and 56, in position, when the rolls 53, and 54, thereon are in operative connection with the rollers 51, and 52, respectively, I employ locking levers 65, and 66, which pivoted upon the plates 1, and 2, respectively, are provided upon one arm with a hook shaped portion 67, and 68, which takes under the outer ends of each of the shafts 61, and 62, of the pressure rolls, and are held in close contact therewith by springs 68, and 69, which extend from the remaining arms of said levers, to studs which project from the frame, see Fig. 5. It is to be understood that each side of the frame of the machine, is provided with locking devices as described.

Any means, other than that shown and described, of maintaining a pressure roll in contact with a picture bearing band, or film upon the rollers by which it is moved, so as to prevent the slipping of such band, or film, may be employed. As illustrated in the drawings the picture bearing band, or film F, extends between the rollers 51, and 52, by which such band, or film is moved, and the rollers 19, and 20, upon the opposite ends of the carrier 11, and inasmuch as it is desirable that such band, or film be continuously maintained at the same tension, in order that no buckling of such band, or film, upon the face of the carrier 11, shall occur during the action of the device, as well as to insure that the distance through which said band, or film passes between the rollers 51, and 19, and 52, and 20, respectively, shall remain the same continuously, I provide devices to attain such ends, which devices consist in rollers 71, and 72, which are journaled at their opposite ends respectively in one end each of pairs of links 73, 73, and 74, 74, at the top of the machine, and 75, 75, and 76, 76, at the bottom of the machine, all of which links are of equal length, and the opposite ends of each pair of which is pivoted upon the journals of the rollers 19, and 51, and 20, and 52, respectively, see Figs. 3 and 4.

By reference to Fig. 4, the course followed by the band, or film F, through the machine, may be readily traced from its entrance at the upper part of such machine to, and about the pressure roll 53, and over the roller 51, thence over the tension roll 71, to the roller 19, at the upper end of the carrier 11, thence to and around the roller 20, at the lower end of said carrier 11, tension roller 72, feed roller 51, and pressure roll 54, as is indicated by the arrows $q$, and $r$. Guide rolls 77, and 78, at the points where the band, or film enters, and leaves the machine operate to direct said band, or film to the several rollers noted. I provide that rays of light from the source of illumination, shall be wholly prevented from passing to the band, or film save only at the predetermined point of exposure of a picture thereupon, to which end I arrange, (between, and in alinement with the condenser lens, and objective lens,) a tube 79, preferably rectangular in cross section, and provided with outwardly diverging sides, top, and bottom, as shown, see Figs. 4, and 17. I provide that the tube 79, shall be longitudinally adjustable, to which end I form slots 80, and 81, through the opposite sides of said tube to move upon headed studs 82, and 83, which project from the frame, and I extend the forward end of said tube between, and in light contact with bars 84, and 85, which extend from side to side of the frame, and are provided with lugs 86, and 87, at opposite sides of the tube, to prevent lateral displacement thereof, see Figs. 4, and 17. I provide the tube 79, upon its lower surface, with a rack bar 88, to be arranged and moved by a pinion 89, mounted upon a shaft 90, which is journaled in the sides of the frame. I also provide the tube with a hinged shutter 91, rigid upon a shaft 92, journaled in the sides of the tube, and extending at one side, through an aperture in the frame to be actuated from the exterior of the machine. The shutter 91, may be formed of any desirable material suitable for the purpose of obstructing, in whole, or in part, the passage of light, or heat, through the tube to the film. I provide the forward end of the tube 79, with rollers 93, and 94, which bear against the film, between the rollers 19, and 20, upon the carrier 11, and operate to maintain said film under tension. If desired the tube 79, may have continuous forward pressure applied thereto by springs, or otherwise, to increase tension upon the band, or film.

By reference to Figs. 3, and 4, it will be noted that the forward end of the tube 79, projects through the aperture 16, in the carrier 11, and definitely determines the location of the picture during the time limit of exposure. As has been hereinbefore stated, the time limit of exposure of a picture upon the band, or film, in the present embodiment of my invention, is wholly determined by the movement of the carrier 11, thus such time limit of exposure will begin at the end of the downward movement of the carrier, extend through its full upward movement, and terminate at the commencement of its next succeeding downward movement, during which time, it is to be understood, the band, or film will move in synchronism with said carrier, but in direction exactly opposite thereto, that is to say, as the carrier 11, is moved upward, the band or film thereon will be moved downward, and inasmuch as the movement of such band, or film exactly equals that of the carrier upon which it is mounted, and moved, it will be readily apparent that a predetermined point upon the surface of such band, or film will positively maintain its position, so far as regards a predetermined point upon a stationary surface placed at any desired distance therefrom.

By reference to Figs. 32, to 34, inclusive, the relative positions of the parts last above referred to, and the operation of the same will be readily apparent, and easily understood. Of the views noted, Fig. 32, shows the carrier 11, at its lowest point of movement, Fig. 33, shows said carrier at a point intermediate of its full movement, and Fig. 34, shows said carrier at its highest point of movement, and in each of said views the main essential elements, comprised in the portion of the device under consideration, are included, thus, the carrier 11, with its rack bar 36, engaging,—for the purpose of this explanation,—the gear wheel 46, here indicated by its pitch line only, the rollers 51, and 52, moved by said gear wheel in manner hereinbefore described, the pressure rolls 53, and 54, the rollers 19, and 20, at the opposite ends of the carrier 11, and the tension rolls 71, and 72, and in all of the views noted, the direction in which the band, or film F, the gear wheel 46, and the rack bar 36, are moved is indicated by arrows. I have also shown a stationary picture receiving surface S, in connection with each of the figures noted, and have thereon marked, at Q, a point opposite which the center N, O, and P, of successive pictures upon the band, or film F, are to be maintained during the time limit of exposure of each thereof, which as has been stated is determined by the carrier 11.

By reference to Figs. 32 to 34, inclusive, it will be seen that the point upon the band, or film F, indicated by the letter P,—which point marks the center of a picture, as has been explained,—is maintained opposite the point upon the picture receiving surface indicated by the letter Q, throughout the entire upward movement of the carrier 11, and it will therefore be readily understood that at such point, the band, or film is actually motionless, although as is indicated by the changed position of the picture centers, marked N, and O, upon said band, or film on the carrier 11, it will be clear that the band, or film is continuously being moved to, and upon the carrier 11, at its upper end, and discharged therefrom at its lower end by the rotation of the rollers 51, and 52, through the movement of the gear wheel 46, by its actuating rack bar 36, carried by the carrier 11. As has been hereinbefore stated, the band, or film F, does not move upon the carrier 11, during the downward movement of said carrier, but is carried forward thereby, and it will therefore be apparent that such action will operate to bring the next succeeding picture on the band, or film, indicated by O, into position opposite the point Q, on the picture surface S, when the carrier has again reached its lowest point of movement as is shown in Fig. 35.

From the foregoing it will be understood that that portion of the picture bearing band, or film, which is upon the carrier 11, has practically a continuous forward movement in that it is moved upon, and down the face of the carrier as the latter named is moved upward, and is carried forward bodily by the carrier in its downward movement.

As has been hereinbefore described, the picture bearing band, or film is moved to, and upon the carrier 11, by rollers rotated by the gear wheel 46, which latter is actuated by the oscillating gear segment 37, that is engaged, and moved up, and down by the rack bar 36, upon the carrier 11, and inasmuch as it is necessary to the purposes of the present invention, that such gear wheel 46, shall be moved during the upward movement only of said carrier 11, and shall during the downward movement thereof, remain absolutely stationary, it will be apparent that such gear wheel must be provided with mechanism to attain such result. To the accomplishment of the purposes noted, I provide that said gear wheel 46, shall be alternately locked to the segment 37, to move therewith during the upward movement of the carrier 11, and to a stationary part of the frame during the opposite downward movement of said carrier, and to the first of said ends, I provide the shaft 38, upon its opopsite sides, with grooves, or key seats 95, and 96, to receive sliding bars 97, and 98, provided at the outer ends with lugs 99, 99, and 100, 100, to engage the opposite sides respectively, of a block 101, which mounted to slide freely upon the shaft 38, has one edge concaved to closely fit the periphery of the wheel 29, and is provided with a stud 102, to project into a cam groove 103, which extends, in the periphery of the wheel, around the same for the purpose of moving the block 101, and its connected bars 97, and 98, for a purpose presently to be explained. The function of the bars 97, and 98, is to move the locking bar 41, in opposite directions, and the teeth 43, upon said locking bar, into, and out of connection with the teeth of the wheel 46, and to such end I provide said bars 97, and 98, with lugs 104, and 105, and so dispose said lugs, as regards the locking bar 41, which they are to move, that they shall be alternately in contact therewith, see Figs. 8, 9, 23, and 24. To facilitate the movement of the locking bar 41, by the lugs 104, and 105, of the bars 97, and 98, I provide said lugs with inclined portions 106, and 107, as shown. The outer surface of each of the bars 97, and 98, save only at the places occupied by the lugs 99, 100, and 104, 105, thereon, are cut away to conform to, and with the outer surface of the shaft 38, for reasons which will be apparent.

As has been hereinbefore stated, the function of the groove 103, in the periphery of the wheel 29, is to impart lateral movement to the block 101; upon the shaft 38, and thereby move the lugs 104, and 105, upon the bars 97, and 98, into engagement with the locking bar 41, to move the same, and to such end I provide that such groove 103, shall extend, for the greater part of its length about the wheel, near to, and parallel with the inner surface of said wheel, and for a shorter distance, near to, and parallel with the outer surface of said wheel, and that the ends of such portions of the groove shall be joined together by short, oppositely inclined sections 108, and 109, see Fig. 22. To determine the length of the sections noted of the groove 103, I provide that the longest, (that nearest the inner surface of the wheel,) shall extend between the radial lines $f$ and $h$, as does the spiral groove 28, upon the face of the wheel 29, that the shorter portion of said groove 103, (that nearest the outer face of the wheel,) shall extend between the radial lines $i$, and $e$, as does that section of the groove 28, which joins the ends of said groove 28, upon the face of said wheel, and that the inclined portions of the groove 103, shall extend between the radial lines $h$, and $i$, and $e$, and $f$, respectively, as does the portions of the groove 28, which are concentric with the center of the wheel 29, see Figs. 21, and 22. By the arrangement noted, of said groove 103, it is to be understood that the block 101, will remain at its inmost limit of movement during the entire upward movement of the carrier 11, and will, during such movement, maintain the lug 104, upon the bar 97, in contact with the rear surface of the aperture through the locking bar 41, to hold said bar at its inmost limit of movement, and the teeth 43, upon said bar, in engagement with the teeth of the gear wheel 46, see Fig. 8, whereby said gear wheel is held rigid with the segment 37, to move therewith and operate the rollers 51, and 52, to carry the picture bearing band, or film forward to, and upon the carrier 11, as has been hereinbefore described. It will also be understood that the continued rotation of the wheel 29, will bring the inclined portion 108, of the groove into contact with the stud upon said block 101, to move said block to its outmost limit of movement and thus move the lug 105, upon the bar 98, into contact with the forward side of the aperture in the locking bar 41, to move said bar forward, and the teeth 43, thereon out of engagement with the wheel 46, to release said wheel from engagement with the segment 37, and since it is necessary that the wheel 46, be positively held from rotation during the downward movement of the carrier 11, which begins simultaneously with the arrival of the block 101, at its outermost limit of movement, I provide means to accomplish such purpose, to which end I hinge a compound bell crank lever, comprising a member 110, and a member 111, by a pivot 112, to the outer end of a bracket 113, which extends to, and is secured upon the member 1, of the frame as shown.

I provide that one arm of the member 110, of the bell crank lever, shall extend to and terminate between lugs 114, and 115, which project from one side of the sliding block 101, as shown, and that the remaining arm of said member 110, shall, at its inner end, be provided with upwardly projecting lugs 116, and 117, to alternately contact with the edges of the remaining member 111, of said compound lever, which, pivoted upon the stud 112, extends thence, in contact with the member 110, between the studs, 116, and 117, to a point in juxtaposition to the gear wheel 46, and is, at such point, provided with a cross head 118, having teeth 119, thereon to engage with the teeth of the gear wheel 46.

I provide that the outer end of the member 111, of the compound lever, shall be held from movement up, or down, to which end I secure a block 120, to the bracket 113, at, or near the end of said member 111, and provide said block with a slot 121, to receive, and steady said member 111, see Fig. 6.

I provide that the cross head 118, upon the outer end of the member 111, shall have limited movement only, that is to say, that such cross-head shall move only far enough to free the teeth thereupon, from the teeth of the gear wheel 46, see Fig. 2, and to such end provide that the lugs 116, and 117, upon the member 110, shall be so spaced as to contact alternately with the opposite edges of the member 111, the one, lug 116, to positively hold the teeth 119, of the cross head 118, in full engagement with the teeth of the gear wheel 46, to hold such wheel from rotation when the block 101, is at its outmost limit of movement, see Fig. 9, at which time the carrier 11, is moving downward; the other, lug 117, to positively hold the teeth 119, of said cross head 118, out of engagement with the teeth of the gear wheel 46, when the block 101, is at its inmost limit of movement, see Fig. 8, at which time the carrier 11, is moving upward to rotate the wheel 46.

To positively prevent movement of the gear wheel 46, except at such time when it is to be moved by the segment 37, I provide that the teeth 119, of the head 118, shall enter into full engagement with the teeth of the gear wheel 46, before the teeth 43, upon the locking bar 41, shall be disengaged from the teeth of said gear wheel 46, when the carrier is to commence its downward movement, and also that the teeth upon said locking bar 41, shall enter into engagement with the teeth of the gear wheel 46, while the teeth 119, of the cross head 118, is yet in full engagement with the teeth of said wheel 46, to which end I mount a torsion spring 122, upon the pivot 112, of the compound lever, and provide that the opposite ends of such spring, shall bear respectively upon the rear edge of the member 111, and the lug 116, of the member 110, of such compound lever, whereby said member 111, will be maintained in contact with the lug 117, of said member 110, see Fig. 7.

It is to be understood that, (because of the peculiar arrangement of the parts last above described,) the teeth upon the member 111, will enter into full engagement with the teeth of the gear wheel 46, during the first part of the outward movement of the block 101, to lock said gear wheel from movement, and that said teeth upon the member 111, will be released from engagement with the gear wheel 46, during the last part of the inward movement of said block 101.

By reference to Fig. 10, it will be observed that a portion of the central aperture through the wheel 46, is enlarged, this for the accommodation of the lug 104, upon the sliding bar 97, see Fig. 9. If desired the upward, and downward movement of the carrier 11, may be increased, or decreased, to which end the actuating lever 24, may be provided, intermediate of its ends, with a slot 123, for the passage of the screw threaded shank of the stud 27, which coacts with the groove 28, in the actuating wheel, a nut 124, upon the shank of the stud 27, bears upon the face of the lever to hold said stud in position when adjusted. I also provide that the pivotal point of the lever may be changed to suit the adjustment of the stud 27, to which end I may provide the frame of the machine with a slot 125, see Fig. 6, for the passage of the screw threaded shank of the pivot upon which the lever is mounted, a nut 126, upon the shank of said pivot holds it in position when adjusted.

While I prefer to move the picture bearing band, or film to, and from the carrier 11, and to hold the same in proper position thereupon, by plain surfaced rollers, as 51, and 52, in connection with pressure rolls, I yet do not desire to wholly confine myself to the use of such plain rollers, since rollers having spurs, or teeth, similar to those now in use, may be employed in connection with the peculiar mechanism comprised in my invention, and I therefore provide that rollers 127, provided with projecting pins, or spurs 128, to engage apertures formed through the band, or film, may when desired, be substituted for the rollers 51, and 52, and that pressure rolls 129, may, if desired, be used in connection with said rollers 127, see Fig. 30.

While it is not my purpose to use a shutter of any type whatsoever, in connection with my invention, and more especially in connection with adaptations of such invention to practice as projecting machines, for the reason that such a device is, not only, in no way essential to the successful operation of the machine, but rather an objectionable adjunct thereto, I yet do not desire to be confined to the use of such invention without a shutter, since in some instances the use of a shutter might be beneficial to certain adaptations of the invention, particularly in its adaptation to the purposes of a camera, and I have therefore provided for the connection of such shutter with the machine, to which end I provide the shaft 30, upon which the actuating wheel 29, is mounted, with a bevel gear wheel 130, connected to turn in unison with said actuating wheel, and to engage and rotate a like bevel gear wheel 131, upon one end of a shaft 132, which extends at right angles to the shaft 40, and is journaled in bearings 133, and 134, secured to the support E, and at a suitable place upon said shaft 132, I mount a shutter 135, which in the present instance is constructed of suitable sheet metal, and in form as shown in Fig. 3, by dotted lines, by reference to which figure it will be seen that such shutter is practically T shaped as regards its outline, that is to say, consists in a section having inclined upper and lower edges, arranged at the outer end of an arm which formed integral with said outer section, and of sufficient size to insure strength, and rigidity, projects from a hub 136, upon the shaft 132. The shutter 135 may be provided with a counterpoise 137, upon its side opposite its arm to insure steadiness of movement to said shutter, during its rotation.

I provide that the lower inclined edge of the shutter, and upper edge of the picture being exposed shall coincide with each other, at the instant the carrier 11, commences its downward movement, whereby, as will be apparent, by the simultaneous downward movement of the shutter, and carrier, the next succeeding picture upon said carrier will be covered during the full period of time of substitution of one picture for another at the point of exposure.

It is to be understood that the speed with which the shutter 135, moves is much greater than is that of the carrier 11, such comparing as the radius of said shutter compares with the radius of the actuating wheel 29, which in the present instance is, approximately 3, to 1, by which it is to be understood that the upper edge of the shutter 135, is timed to coincide with the lower edge of the picture which is to be exposed, simultaneously with the commencement of the upward movement of the carrier 11. If desired the shutter 135, may be moved in direction opposite that in which the carrier 11, moves during the substitution of picture for picture, in the field of exposure, or illumination.

As has been hereinbefore described the picture bearing band, or film, moves in synchronism with the carrier 11, upon which it is supported, and in direction opposite to that in which said carrier is moved, during the time limit of exposure of a picture thereupon, and that such band, or film has no movement upon said carrier during the time limit of the change, or substitution of picture, for picture in the field of exposure, or illumination, but is, instead thereof, carried forward by the movement of the carrier, and that, because of such peculiar operation, as will be readily apparent, the speed with which the substitution of picture for picture, in the field of exposure, or illumination is brought about, may be highly increased without fear, or danger of injuring the band, or film in any way, through the rapidity of speed with which such substitution is effected, for, as will also be readily apparent, and understood, the substitution of picture for picture, so far as regards the movement of the band, or film itself, is really brought about upon the carrier, during the upward movement of said carrier, the downward movement of which, merely carries such band, or film forward without movement thereupon.

From the foregoing it will therefore be apparent that any desired speed of substitution of picture, for picture, in the field of illumination, other than that shown herein may be used, for instance, while in the present adaptation of my invention, the speed with which the substitution of picture for picture in the field of illumination is effected, is seven times that of the time limit of exposure of such picture, such speed may be increased two, or three, or more times, it only being necessary to such end, to increase the diameter of the actuating wheel 29, that the parts thereof apportioned to the cam grooves, which raise and lower the carrier 11, may compare each with the other, to attain the end sought.

Heretofore the practice, in the art to which my invention appertains, has been to move the picture bearing band, or film forward to show successive pictures thereupon, by impulses applied thereto between the intervals of exposure of the pictures thereupon, a practice which not only subjects the band, or film to great strain and wear, but also produces objectionable results, such for instance as a jerky, flickering movement, due to slight differences in the movement of the band, or film, by the impulses applied thereto, further the distance to which such band, or film can be safely moved is practically limited to, or near to the distance of one inch, in view of which I deem the invention hereinbefore disclosed, to be of great importance as I am enabled thereby to bodily move a picture bearing surface band, or film forward, during the time limit of substitution of picture for picture, to distances many times greater than that above noted, and with a greater speed than has heretofore been attainable in this art, and with perfect safety to the band, or film, to produce an absolutely flickerless reflection of the picture upon a stationary picture receiving surface, and also, (since as has been stated the use of a shutter is not needed) without any blurred effect, since both the movement of the band, or film during the time limit of exposure of pictures thereupon, and the limit of substitution of picture for picture, is made in the full field of illumination, that is to say, without interposing a shutter of any kind between the source of illumination and a picture upon the band, or film, either during the period of exposure, or the period of change.

I preferably hold the upper film reel 138, under the pressure of a spring armed spider 139, to maintain tension upon the film during the operation of the machine, and I further make the shaft 140, of the lower film reel 141, rigid with said reel 141, and provide said shaft with a spring armed spider 142, to bear upon the pulley 143, by which the reel 141, is turned through a belt 144, from the shaft 30, of the wheel 29, whereby the pulley 143, is maintained under frictional contact with the shaft 140, to turn the same, further the film reels 138, and 141, are removable to receive fresh films when desired.

The operation of my invention will, in view of the foregoing explanation, be understood and therefore a specific explanation of such operation is not deemed necessary to enable those skilled in the art, to fully understand the same in every detail.

It will be understood that while I have herein described one method whereby a picture upon a moving band, or film may be held at a predetermined point between a source of illumination, and a selected spot upon a stationary picture receiving surface whereon the reflection of such picture is to be thrown, during the time limit of exposure, I yet do not desire to confine myself solely to such mechanism, since different mechanisms may be devised to attain the result noted, which result constitutes the essential spirit of the present invention.

Having thus described my invention I claim, and desire to secure by Letters Patent,

1. A reciprocating carrier, means to continuously move said carrier in opposite directions, a picture bearing band or film to be carried by said carrier, and means controlled and actuated by said carrier to move the band or film to and upon said carrier, substantially as described.

2. A reciprocating carrier, means to continuously move said carrier in opposite directions, a picture bearing band or film to be carried by said carrier, and means actuated by the carrier during its movement in one direction only to move said band or film to and upon said carrier, substantially as described.

3. A reciprocating carrier, means to continuously move said carrier in opposite directions, a picture bearing band or film to be carried by said carrier, and intermittently actuated means to move said band or film to and upon the carrier, substantially as described.

4. A reciprocating carrier, means to continuously move said carrier in opposite directions, a picture bearing band or film to be carried by said carrier, a device to move said band or film to and upon said carrier during the movement of said carrier in one direction, and means to hold said band or film from movement upon the carrier during the movement of said carrier in the opposite direction, substantially as described.

5. A continuously reciprocating carrier, means to move said carrier in one direction at one speed and in the opposite direction at another speed, a picture bearing band or film to be carried by said carrier, and intermittently actuated means to move said band or film to and upon said carrier, substantially as described.

6. A continuously reciprocating carrier, means to move said carrier in one direction at one speed and in the opposite direction at another speed, a picture bearing band or film to be carried by said carrier, and means controlled and actuated by the carrier to move said band or film to and upon said carrier, substantially as described.

7. A continuously reciprocating carrier, means to move said carrier in one direction at one speed and in the opposite direction at another speed, a picture bearing band or film to be carried by said carrier, and means to move said band or film to and upon the carrier during the movement of said carrier in one direction only, substantially as described.

8. A continuously reciprocating carrier, means to move said carrier in one direction at one speed and in the opposite direction at another speed, a picture bearing band or film to be carried by said carrier, means to move said band or film to and upon the carrier during the movement of the carrier in one direction, and means to hold the band or film from movement upon the carrier during the movement of said carrier in the opposite direction, substantially as described.

9. A picture bearing band or film, a reciprocating carrier to support said band or film, means actuated by the carrier during its movement in one direction only to move the band or film to and upon said carrier, and means to move the carrier during the period that the band or film is moving thereupon at a speed equal to the speed at which the band or film is moving and to move said carrier during the period that the band or film is stationary thereupon at uniformly accelerated speed, substantially as described.

10. A picture bearing band or film, a carrier to support said band or film, means to intermittently move said band or film to and upon the carrier, means to alternately reciprocate the carrier in direction opposite to and in direction likeunto that in which the band or film is moved to and upon said carrier, and means to move the carrier and the band or film with equal speeds during the period that said band or film is moving upon said carrier and to move said carrier with accelerated speed during the period that the band or film is stationary thereupon, substantially as described.

11. A picture bearing band or film, a carrier therefor, intermittently moving feed devices to move said band or film, and means to maintain a part of said band or film substantially immovable at a predetermined point to expose a picture thereon during the period of movement of the feed devices and the band or film moved thereby, substantially as described.

12. A picture bearing band or film, a carrier therefor, a plurality of intermittently moving feed devices to move said band or film, and means to maintain a part of said band or film upon a looped portion thereof between the feed devices substantially immovable at a predetermined point to expose a picture thereon during the period of movement of the feed devices and the band or film moved thereby, substantially as described.

13. A picture bearing band or film, a carrier therefor, feed devices to be moved intermittently in one direction only to move said band or film forward, and means to maintain a part of said band or film substantially immovable at a predetermined point to expose a picture thereon during the period of movement of the feed devices and the band or film moved thereby, substantially as described.

14. A picture bearing band or film, a carrier therefor, a plurality of feed devices to be intermittently moved in one direction only to move said band or film forward, and means to maintain a part of said band or film upon a looped portion thereof between the feed devices substantially immovable at a predetermined point to expose a picture thereon during the period of movement of the feed devices and the band or film moved thereby, substantially as described.

15. A picture bearing band or film, a carrier therefor, intermittently moving feed devices to move said band or film, means to positively hold the band or film from movement upon the feed devices, and means to maintain a part of the band or film substantially immovable at a predetermined point to expose a picture thereon during the period of movement of the feed devices and the band or film moved thereby, substantially as described.

16. A picture bearing band or film, a carrier therefor, a plurality of feed devices to be intermittently moved in one direction only to move said band or film forward, means to insure synchronism in the movement of the feed devices, and means to maintain a part of the band or film upon a looped portion thereof substantially immovable at a predetermined point to expose a picture thereon during the period of movement of the feed devices and the band or film moved thereby, substantially as described.

17. A picture bearing band or film, a carrier therefor, intermittently actuated feed devices to move said band or film upon said carrier, means to maintain a part of said band or film substantially immovable at a predetermined point to expose a picture thereon during the period of movement of said feed devices, and means independent of the feed devices to move said stationary part of the band or film while said feed devices are not moving to substitute picture for picture at said predetermined point of exposure, substantially as described.

18. A picture bearing band or film, a carrier therefor, intermittently actuated feed rolls to move the band or film forward, means to hold said band or film from movement upon said feed rolls, and means to maintain a part of said band or film substantially immovable at a predetermined point to expose a picture thereon during the period of movement of the feed rolls.

19. A picture bearing band or film, a carrier therefor, rotatable feed rolls therefor, mechanism to intermittently rotate said feed rolls to move said band or film forward, and means independent of said feed rolls to maintain a part of said band or film substantially immovable at a predetermined point to expose a picture thereon during the period of movement of the feed rolls, substantially as described.

20. A picture bearing band or film, rotatable feed rolls therefor, mechanism to intermittently rotate said feed rolls to move the band or film forward, means separate from said feed rolls to maintain a part of said band or film substantially immovable at a predetermined point to expose a picture thereon during the movement of the feed rolls, and means to quickly move said stationary part of the band or film to substitute picture for picture at such predetermined point of exposure while the feed rolls are not rotating, substantially as described.

21. A movable carrier to support a picture bearing band or film, means to move said carrier, a picture bearing band or film, and feed devices actuated by the movement of the carrier to move said band or film to and upon the carrier to expose a picture thereupon at a predetermined point, substantially as described.

22. A reciprocating carrier to support a picture bearing band or film, means to move said carrier, a picture bearing band or film, and feed devices actuated by the movement of the carrier to move said band or film to and upon said carrier to expose a picture thereupon at a predetermined point, substantially as described.

23. A reciprocating carrier to support a picture bearing band or film, means to move said carrier, a picture bearing band or film, and feed devices actuated by the movement of the carrier in one direction only to move said band or film to and upon the carrier to expose a picture thereupon at a predetermined point, substantially as described.

24. A reciprocating carrier to support a picture bearing band or film, means to move said carrier, a picture bearing band or film, and intermittently moving feed devices actuated by the carrier to move said band or film to and upon the carrier to expose a picture thereon at a predetermined point, substantially as described.

25. A reciprocating carrier to support a picture bearing band or film, means to move said carrier, a picture bearing band or film, and a plurality of feed devices actuated in synchronism by the movement of the carrier to move the band or film to and upon the carrier to expose a picture thereon at a predetermined point, substantially as described.

26. A reciprocating carrier to support a picture bearing band or film, means to move said carrier, a picture bearing band or film, and feed devices actuated by the carrier to move the band or film to and upon the carrier in direction opposite that in which said carrier is moving to expose a picture thereon at a predetermined point, substantially as described.

27. A reciprocating carrier to support a picture bearing band or film, means to move said carrier, a picture bearing band or film, feed devices actuated by the movement of the carrier in one direction to move the band or film to and upon the carrier in direction opposite that in which said carrier is moving to expose a picture thereon at a predetermined point, and means independent of the carrier to hold the feed devices from movement while the carrier is moving in opposite direction, substantially as described.

28. A reciprocating carrier, means to positively move said carrier in opposite directions at unequal speeds, a picture bearing band or film to be supported by said carrier, intermittently moving feed devices to be positively moved by the movement of the carrier in one direction to move the band or film to and upon said carrier to expose a picture thereon at a predetermined point, substantially as described.

29. A reciprocating carrier, means to positively move said carrier in opposite directions at unequal speeds, a picture bearing band or film to be supported by said carrier, intermittently moving feed devices to be positively moved by the movement of the carrier in one direction to move the band or film to and upon the carrier to expose a picture thereon at a predetermined point, and means independent of the carrier to hold the feed devices from movement while the carrier is moving in opposite direction, substantially as described.

30. A reciprocating carrier, means to positively move said carrier in opposite directions at unequal speeds, a picture bearing band or film to be supported by said carrier, a plurality of intermittently moving feed devices to be simultaneously moved by the movement of the carrier in one direction to move the band or film upon and from said carrier to expose a picture thereon at a predetermined point, and means independent of the carrier to hold the feed devices and the band or film thereon from forward movement during the movement of the carrier in opposite direction, substantially as described.

31. A reciprocating carrier, means to move said carrier, a picture bearing band or film, supports therefor, and devices positively controlled and actuated by the movement of the carrier to move the film to and upon said carrier to thereupon expose a picture contained upon said band or film at a predetermined point, substantially as described.

32. A reciprocating carrier, means to move said carrier, a picture bearing band or film, supports therefor, and devices positively controlled and actuated by the movement of the carrier to move the band or film upon and from the opposite ends respectively of the carrier to thereupon expose a picture contained upon the band or film at a predetermined point between said ends, substantially as described.

33. A reciprocating carrier, means to continuously move said carrier in opposite directions at different speeds, a picture bearing band or film, supports therefore, and intermittently actuated feed devices connected to move said band or film upon and from the opposite ends respectively of the carrier and across the axis of a lens to expose a picture contained upon said band or film during the movement of the carrier in one direction only, substantially as described.

34. A picture bearing band or film, supports therefor, a movable carrier, a device to continuously reciprocate said carrier, feed devices to move the band or film, and means controlled by the carrier to intermittently actuate the feed devices to move a part of the band or film to and upon the carrier and across the axis of a lens to expose a picture contained upon said part of the band or film, substantially as described.

35. A movable carrier comprising a frame like structure adapted to support a picture bearing band or film and to maintain a picture thereupon in position for exposure at a predetermined point while permitting the passage of light rays thereto, means to positively move said structure in one direction at a predetermined speed and in the opposite direction at uniformly accelerated speed, a picture bearing band or film, and means intermittently actuated to move a part of said band or film to and upon said structure during its movement in one direction only to expose a picture thereupon and within the field of illumination of said light rays, substantially as described.

36. A movable carrier comprising a frame like structure adapted to support a picture bearing band or film and to maintain a picture thereupon in position for exposure at a predetermined point while permitting passage of light rays thereto, means to vibrate said structure in opposite directions at unequal speeds, a picture bearing band or film, feed devices therefor, and means controlled by said vibrating structure to move said feed devices and therethrough move the picture bearing band or film to and upon the vibrating structure to expose a picture thereon during the movement of said structure in one direction only, substantially as described.

37. A movable carrier comprising a frame like structure adapted to support a picture bearing band or film and to maintain a picture thereupon in position for exposure at a predetermined point while permitting passage of light rays thereto, means to vibrate said structure in opposite directions at unequal speeds, a picture bearing band or film, feed devices therefor, means to actuate said feed devices to move the picture bearing band or film to and upon the vibrating structure in direction opposite to that in which said structure is moving during the movement of said structure in one direction only, and means to hold the band or film from movement upon the structure during the movement of said structure in opposite direction, substantially as described.

38. A picture bearing band or film, feed devices therefor, a movable carrier, and connections controlled by the carrier to actuate the feed devices to move a part of the band or film to and upon the carrier to expose a picture thereupon at a predetermined point during the movement of the feed devices and the carrier, substantially as described.

39. A picture bearing band or film, feed devices therefor, a continuously movable carrier, and connections controlled by the carrier to intermittently actuate the feed devices to move a part of the band or film to and upon the carrier to expose a picture thereupon at a predetermined point during the movement of said feed devices and said carrier, substantially as described.

40. A picture bearing band or film, feed rolls therefor, a movable carrier, connections controlled by the carrier to rotate the feed rolls to move a part of the band or film to and upon the carrier to expose a picture thereupon at a predetermined point during the movement of said feed rolls and carrier, and means to maintain like tension upon the band or film at the opposite ends respectively of the carrier when a part of said band or film is upon said carrier, substantially as described.

41. A picture bearing band or film, feed devices therefor, a movable carrier, connections controlled by the carrier to rotate the feed rolls to move a part of the band or film to and upon the carrier to expose a picture thereupon during the movement of the feed rolls and the carrier, and means to maintain the band or film in position upon the feed rolls and prevent movement therebetween while the band or film is being acted upon by said rolls, substantially as described.

42. A picture bearing band or film, intermittently moving feed rolls therefor, a movable carrier independent of said feed rolls, connections actuated by the movable carrier to turn the feed rolls to move a part of the band or film to and upon the carrier to expose a picture thereupon during the movement of the carrier in one direction, and means to release the feed rolls actuation by the carrier when said carrier is moving in the opposite direction, substantially as described.

43. A picture bearing band or film, intermittently moving feed rolls therefor, a movable carrier independent of said feed rolls, means to move a part of the band or film to and upon the carrier to expose a picture thereupon at a predetermined point during the period of movement of the feed rolls and while the carrier is moving in one direction, and means to substitute picture for picture at the predetermined point of exposure while the feed rolls are not moving and the carrier is moving in opposite direction, substantially as described.

44. A picture bearing band or film, intermittently moving feed rolls to move said band or film, a movable carrier, and means controlled and actuated by the carrier to move the feed rolls and simultaneously therewith move a part of the band or film to and upon the carrier to expose a picture thereupon at a predetermined point, substantially as described.

45. A picture bearing band or film, intermittently rotating feed rolls to move the band or film, a movable carrier, means controlled by the carrier to rotate the feed rolls and simultaneously therewith to move a part of the band or film to and upon the carrier to expose a picture thereupon, and means to hold the feed rolls from rotation and simultaneously therewith to substitute picture for picture at the point of exposure, substantially as described.

46. A picture bearing band or film, rotatable feed rolls to be intermittently rotated to move the band or film, a reciprocating carrier, a device to move said carrier in opposite directions, means controlled and actuated by the carrier to rotate the feed rolls to move a part of the band or film to and upon the carrier to expose a picture thereon at a predetermined point while the carrier is moving in one direction, and means to hold said feed rolls from rotation while the carrier is moving in opposite direction to substitute picture for picture at such predetermined point of exposure.

47. A picture bearing band or film, rotatable feed rolls to be intermittently turned to move the band or film, a reciprocating carrier, a device to move said carrier in opposite directions, means controlled and actuated by the carrier to intermittently turn the feed rolls to move a part of the band or film upon and from the opposite ends respectively of the carrier to expose a picture thereupon during the movement of said carrier in one direction, means to maintain tension upon the band or film at the opposite ends of the carrier, and means to hold the feed rolls from turning and thereby hold the band or film from movement upon the carrier when said carrier is moved in opposite direction, substantially as described.

48. A picture bearing band or film, supports therefor, a reciprocating carrier, a device to move said carrier in opposite directions at unequal speeds, a device controlled and actuated by the carrier to move a part of the band or film to and upon said carrier during its movement in one direction, and means to hold such part of the band or film from movement upon the carrier during the movement of the carrier in opposite direction, substantially as described.

49. A picture bearing band or film, a carrier therefor, rotatable feed rolls to move said band or film, a device to rotate the rotatable feed rolls during the time interval of exposure of a picture upon the band or film, and means to hold such feed rolls from rotation during the time interval between successive exposures of pictures upon the band or film, substantially as described.

50. In picture exhibiting apparatus a picture bearing band or film, feed rolls to move said band or film, a reciprocating carrier, mechanism actuated by the carrier to turn the feed rolls to move a part of the band or film to and upon the carrier when said carrier is moving in one direction, mechanism to release the feed rolls from control of the carrier when said carrier is moving in opposite direction, and means to hold the band or film from movement upon the feed rolls, substantially as described.

51. In picture exhibiting apparatus a picture bearing band or film, a reciprocating carrier, means to move a part of said band or film to and upon the carrier to move thereon in direction opposite that in which the carrier is moving during the movement of said carrier in one direction, and means to prevent the movement of the band or film upon the carrier during the movement of said carrier in opposite direction, substantially as described.

52. In apparatus for exhibiting pictures a movable carrier to support a picture bearing band or film, a picture bearing surface having successive pictures thereupon supported upon said carrier to move thereon during the period of exposure of each successive picture upon said band or film, and means controlled by said carrier whereby each successive picture upon said band or film is brought to a predetermined position for exposure upon said carrier during the movement of said carrier and within the period of exposure of the preceding picture upon said band or film, substantially as described.

53. In apparatus for exhibiting pictures a transparent or translucent tape like photographic film having thereon photographs of successive positions of an object in motion supported upon a movable carrier to move thereon, said movable carrier, and means controlled and actuated by said carrier whereby each successive picture upon said film is brought to a predetermined position for exposure upon said carrier during the movement of said carrier and within the period of exposure of the preceding picture upon said film, substantially as described.

54. In picture exhibiting apparatus a transparent or translucent tape like photographic film having thereon photographs of successive positions of an object in motion said film supported upon a reciprocating carrier to move thereon and be moved thereby, a reciprocating carrier to be moved in opposite directions at different speeds, means actuated by said carrier whereby during the movement of the carrier in one direction each successive picture upon said film is maintained at a predetermined point of exposure during the period of exposure of a picture thereupon and the next adjacent picture thereto brought into position upon the carrier for exposure in its turn, and means to move the carrier in opposite direction to effect the substitution of picture for picture at such point of exposure, substantially as described.

55. In apparatus for exhibiting pictures a movable carrier to support a picture bearing band or film, a picture bearing band or film having pictures thereupon supported upon said carrier to be moved thereby, a device to move said carrier and its supported picture bearing band or film, and means controlled by the carrier and connected to maintain a picture upon said picture bearing band or film substantially immovable at a predetermined point during its period of exposure while the carrier and its supported picture bearing surface is moving, substantially as described.

56. In apparatus for exhibiting pictures a reciprocating carrier to support a picture bearing band or film, a device to move said carrier in opposite directions at unequal speeds to determine both the period of exposure of a picture upon a picture bearing band or film carried by said carrier and the period of withdrawal of said picture and substitution of another therefor, a picture bearing band or film having pictures thereupon supported upon said carrier to be moved thereby during both the period of exposure of a picture upon said band or film and the period of withdrawal of such picture and substitution of another therefor, and means controlled by the carrier to maintain a picture upon said picture bearing band or film substantially immovable at a predetermined point during the period of exposure of such picture, substantially as described.

57. In apparatus for exhibiting pictures a movable carrier to support a picture bearing band or film, a picture bearing band or film having pictures thereupon supported upon said carrier to move therewith, and mechanism to simultaneously move said carrier and its supported picture bearing band or film in opposite directions during the exposure of a picture upon said band or film to maintain said picture at a predetermined point, substantially as described.

58. In apparatus for exhibiting pictures a transparent or translucent tape like picture bearing band or film having thereon photographs of successive positions of an object in motion and supported to move upon a movable carrier, a movable carrier to support such picture bearing band or film, and mechanism to simultaneously move said carrier and therethrough its supported picture bearing band or film in opposite directions during the exposure of a picture upon said band or film to maintain said picture at a predetermined point, substantially as described.

59. In apparatus for exhibiting pictures a movable carrier to support a picture bearing band or film, a picture bearing band or film having pictures thereupon supported upon said carrier to move therewith, mechanism to simultaneously move said carrier and therethrough its supported picture bearing band or film in opposite directions during the period of exposure of a picture upon said band or film to maintain said picture at a predetermined point during such exposure, and means to simultaneously move said carrier and its supported picture bearing band or film in similar direction during the period of substitution of picture for picture at such predetermined point, substantially as described.

60. In picture exhibiting apparatus a reciprocating carrier to support a picture bearing surface or film, a device to move said carrier, a picture bearing band or film supported upon said carrier to be carried thereby, and mechanism actuated by said carrier to move said picture bearing band or film upon said carrier during the movement of said carrier in one direction and to hold said band or film from movement upon said carrier during the movement of said carrier in opposite direction, substantially as described.

61. In apparatus for exhibiting pictures a reciprocating carrier to support a picture bearing band or film, a device to move such carrier, a picture bearing band or film mounted upon said carrier to be carried thereby, mechanism actuated by the carrier to move the picture bearing band or film upon the carrier during the movement of said carrier in one direction, and means to hold such picture bearing band or film from movement upon the carrier during the movement of such carrier in opposite direction, substantially as described.

62. In apparatus for exhibiting pictures a reciprocating carrier to support a picture bearing band or film said carrier adapted to be moved in opposite directions at different speeds, a picture bearing band or film mounted upon said carrier to be carried thereby, an oscillating device connected to be moved by and in unison with the carrier, and mechanism connected to be moved by such oscillating device to move the picture bearing band or film upon the carrier, in direction opposite that in which said carrier is moving during a portion of the movement of said carrier, substantially as described.

63. In apparatus for exhibiting pictures a reciprocating carrier to support a picture bearing band or film, a picture bearing band or film mounted upon said carrier to be carried thereby, an oscillating device connected to be moved by and in unison with the carrier, mechanism connected to be moved by such oscillating device to move the picture bearing band or film upon the carrier in direction opposite that in which said carrier is moving during a portion of the full movement of said carrier, and means to hold the picture bearing band from movement upon said carrier to move therewith during the remaining portion of the full movement of said carrier, substantially as described.

64. In apparatus for exhibiting pictures a reciprocating carrier to support a picture bearing band or film, said picture bearing band or film, feed rollers mounted to move said band or film, and mechanism actuated by the carrier connected to turn said rollers to move the picture bearing band or film forward upon the carrier during the movement of said carrier in one direction and to hold said rollers from turning and the picture bearing band or film from movement on the carrier during the movement of said carrier in opposite direction, substantially as described.

65. The combination in apparatus for exhibiting pictures of a reciprocating carrier to support a picture bearing band or film, a picture bearing band or film upon said carrier, rollers to move said picture bearing band or film, gear connections between said carrier and said rollers to actuate said rollers and move the picture bearing band or film upon the carrier during its movement in one direction, and locking mechanism to hold said rollers from rotation and the picture bearing band or film from movement on the carrier during the movement of said carrier in opposite direction, substantially as described.

66. In apparatus for exhibiting pictures the combination of a reciprocating carrier to support a picture bearing band or film, said picture bearing band or film, an oscillating device adapted to be moved by and in unison with said carrier, a gear wheel mounted in juxtaposition to said oscillating device to rotate pinions rigid upon rollers which move the picture bearing band or film to and upon the carrier, and locking mechanism upon the oscillating device to engage the gear wheel to hold said wheel rigid with the oscillating device and its actuating carrier during the movement of said carrier in one direction, substantially as described.

67. In picture exhibiting apparatus and in combination a reciprocating carrier to support a picture bearing band or film, said picture bearing band or film, an oscillating segment having gear teeth thereon to engage a rack bar upon the carrier, a gear wheel mounted in juxtaposition to said segment to rotate gear pinions rigid upon rollers which move the picture bearing band or film to and upon the carrier, a locking bar movable upon the oscillating segment and having teeth to engage the gear wheel to hold said wheel rigid with said oscillating device, and means to move said locking bar into engagement with said gear wheel when the carrier is to be moved in one direction and to release said bar from the gear wheel when the carrier is to be moved in opposite direction, substantially as described.

68. The combination in apparatus for exhibiting pictures of a reciprocating carrier to support a picture bearing band or film, said picture bearing band or film, rollers mounted to move said picture bearing band or film to and upon the carrier and provided with gear pinions through which they receive motion from a gear wheel which is actuated by the movement of said carrier, said gear wheel, and means to alternately lock said gear wheel in operative engagement with the carrier to be moved thereby during its movement in one direction and to a stationary part of the machine to hold said wheel from movement during the return movement of said carrier, substantially as described.

69. In apparatus for exhibiting pictures and in combination a reciprocating carrier to support a picture bearing band or film, a cam actuated lever fulcrumed on a stationary part of said apparatus and adapted to be moved in opposite directions at different speeds, connections between said lever and said carrier to move said carrier, a picture bearing band or film to move upon said carrier, rollers to move said picture bearing band or film to and upon said carrier, gear connections actuated by said carrier to turn said rollers to move the picture bearing band or film upon the carrier during the movement of said carrier in one direction, and independent means to hold said picture bearing band or film stationary upon the carrier during the movement of such carrier in opposite direction, substantially as described.

70. In an apparatus for exhibiting pictures an actuating device comprising a wheel having a cam groove formed in one side thereof and extending in spiral direction nearly the entire distance around the wheel to move a carrier in one direction at comparatively low speed the ends of said spiral portion of the groove joined by an abrupt angular portion to move said carrier in the opposite direction at high speed, a lever hinged to a stationary part of the apparatus and provided with a stud which projects into the cam groove to receive lateral movement therefrom as the actuating wheel is rotated to move said lever, a reciprocating carrier connected to be moved by said lever to move a picture bearing band or film mounted upon said carrier to be moved thereby, said picture bearing band or film, and means to move said band or film upon said carrier during the movement of said carrier in one direction and to hold said band or film from movement on the carrier during the movement of said carrier in opposite direction, substantially as described.

71. In apparatus for exhibiting pictures a reciprocating carrier to support a picture bearing band or film, an actuating device to move said carrier in opposite directions at dissimilar speeds, a picture bearing band or film mounted upon said carrier, a spur gear wheel mounted to be turned during the movement of the carrier in one direction, rollers turned by the gear wheel to move the picture bearing band or film to and upon the carrier, and locking devices independent of each other to alternately lock the spur gear wheel to the reciprocating carrier to be moved thereby and to a stationary part of the apparatus to be held from movement, substantially as described.

72. In apparatus for exhibiting pictures a reciprocating carrier to support a picture bearing band or film, a gear segment rigid with a shaft journaled in the frame of the machine and connected to be oscillated by and in unison with the reciprocating carrier, a spur gear wheel mounted to turn freely upon the supporting shaft of the gear segment, a locking bar between and in contact with the gear segment and spur gear wheel respectively and held from lateral movement upon said segment while moving longitudinally thereon, a movable device mounted upon the supporting shaft of the gear segment and connected to be moved by the actuating cam wheel, and connections between said movable device and the locking bar to move said bar into connection with the spur gear wheel when said wheel is to be moved in and out of connection with the spur gear wheel when said wheel is to be held from movement, substantially as described.

73. The combination in apparatus for exhibiting pictures of a reciprocating carrier to support a picture bearing band or film, an oscillating gear segment rigid with a shaft journaled in the frame of said apparatus, a spur gear wheel mounted to turn upon said segment supporting shaft, and a locking bar movable upon the oscillating gear segment to engage the spur gear wheel to hold the same rigid with said segment during the movement of the carrier in one direction, with a laterally movable block mounted to be moved upon the segment supporting shaft by a cam groove in the periphery of the actuating wheel, and bars movable in grooves formed in the segment supporting shaft said bars having inclined lugs to actuate the locking bar to move the same into and from engagement with the spur gear wheel, substantially as described.

74. The combination in apparatus for exhibiting pictures of a reciprocating carrier to support a picture bearing band or film, said picture bearing band or film, rollers to move said band or film to and upon said carrier, an oscillating gear segment connected to move in unison with the carrier, a spur gear wheel to turn the rollers which move the picture bearing band or film to and upon the carrier, and locking mechanism actuated to lock the spur gear wheel to the oscillating segment to move therewith during the movement of the carrier in one direction, with a laterally movable block mounted to move upon the segment supporting shaft by a cam groove formed in the actuating wheel, a compound lever fulcrumed upon the frame of the machine and connected to be moved by the laterally sliding block and provided with locking teeth to engage the spur wheel to hold the same from rotation when the carrier is moved in opposite direction, substantially as described.

75. The combination in apparatus for exhibiting pictures of a reciprocating band or film to support a picture bearing band or film, a spur gear wheel actuated by said carrier during its movement in one direction to move a picture bearing band or film to and upon said carrier, with a compound bell crank locking lever hinged to a stationary part of the apparatus and comprising a section to be positively moved by a laterally sliding block actuated by a cam groove formed in the actuating wheel, and a second section held under spring pressure upon the section so positively moved and provided with locking teeth to engage the spur gear wheel to hold said wheel from rotation when the carrier is moved in opposite direction, substantially as described.

76. In apparatus for exhibiting pictures a picture bearing band or film, means to move said band or film, and a tube independent of the casing of the condenser lens and the casing of the objective lens said tube interposed between said band or film and a condenser lens to conduct rays of light through said tube to and upon said band or film, substantially as described.

77. In apparatus for exhibiting pictures a picture bearing band or film, means to move said band or film, an adjustable tube independent of the casings of the condenser lens or objective lens said tube interposed between the band or film and a condenser lens to conduct rays of light through said tube to and upon said band or film, and means to adjust said tube, substantially as described.

78. In apparatus for exhibiting pictures a picture bearing band or film, means to move said band or film, a tube independent of the condenser and objective lens containing casings said tube interposed between the band or film and a condenser lens to conduct rays of light from a source of illumination through said tube to said band or film, and said source of illumination, substantially as described.

79. In apparatus for exhibiting pictures a picture bearing band or film, means to move said band or film, a tube independent of the condenser and objective lens holding tubes or casings said tube interposed between the band or film and a condenser lens to conduct rays of light through said tube to said band or film, and means to obstruct the passage of said light rays through said tube, substantially as described.

80. In apparatus for exhibiting pictures a picture bearing band or film, means to move said band or film, a tube independent of the condenser and objective lens holding tubes or casings said tube interposed between said band or film and a condenser lens to conduct rays of light through said tube to and upon said band or film, and rollers upon said tube to impinge against said band or film to support the same, substantially as described.

81. In apparatus for exhibiting pictures a picture bearing band or film, means to move said band or film, a tube independent of the condenser and objective lens holding tubes or casings said tube interposed between said band or film and a condenser lens to conduct rays of light through said tube to and upon said film, rollers upon said tube to impinge against said band or film to support and steady the same, and means to move the tube in longitudinal direction to increase the pressure of the rollers on said tube against the band or film, substantially as described.

82. In apparatus for exhibiting pictures a tube independent of the condenser lens and the objective lens and their respective casings and arranged between the condenser lens and a picture bearing band or film to conduct rays of light from a source of illumination to a picture upon said band or film at a predetermined point, said picture bearing band or film, and movable mechanism to cause said band or film to bring a picture thereupon into alinement with the tube and within the field of illumination of the light rays therethrough, substantially as described.

83. In apparatus for exhibiting pictures a tube independent of the condenser lens and the objective lens and their respective casings and arranged between the condenser lens and a picture bearing band or film to conduct rays of light to a picture upon said band or film from a source of illumination, said picture bearing band or film, mechanism to move said band or film to bring a picture thereupon into alinement with the tube and within the field of illumination of the light rays therethrough, and an adjustable device to intercept the passage of such light rays through said tube, substantially as described.

84. In apparatus for exhibiting pictures a tube independent of the condenser lens and the objective lens and their respective casings and arranged between the condenser lens and a picture bearing band or film to conduct rays of light from a source of illumination to a picture upon said band or film at a predetermined point, said picture bearing band or film, mechanism to move said band or film to bring a picture thereupon into alinement with the tube and within the field of illumination of the light rays therethrough, and a device to move said tube in longitudinal direction to adjust the same, substantially as described.

85. In apparatus for exhibiting pictures a supporting frame, a carrier movable upon said frame to support a picture bearing band or film, a picture bearing band or film to be moved to and upon said carrier to be carried thereon, and means to positively prevent movement of said band or film upon said carrier during the movement of said carrier in one direction, substantially as described.

86. In apparatus for exhibiting pictures a supporting frame, a carrier movable upon said frame to carry a picture bearing band or film, a picture bearing band or film to be moved to and upon said carrier to be carried thereby, feed rollers journaled in the frame to move the band or film to and upon the carrier, and means to positively maintain a like length of the band or film between the opposite ends respectively of the carrier and one each of the feed rolls to prevent movement of the band or film upon the carrier during the movement of said carrier in one direction, substantially as described.

87. In apparatus for exhibiting pictures a supporting frame, a reciprocating carrier movable upon said frame to carry a picture bearing band or film, feed rolls journaled in the frame to move a picture bearing band or film to and upon the carrier, a picture bearing band or film mounted upon the feed rolls and extending thence to and about the reciprocating carrier, and means comprising rolls mounted to be maintained continuously equi-distant from each feed roll and the end of the carrier nearest thereto to hold the band or film from movement upon the moving carrier while the feed rolls are stationary, substantially as described.

88. In apparatus for exhibiting pictures a supporting frame, a reciprocating carrier upon said frame to support a picture bearing band or film, a picture bearing band or film to be supported by the carrier, feed rolls journaled in the frame at like distances from the opposite ends of the carrier to move the band or film to and upon the carrier, and compensating supports to be maintained at a like distance from the opposite ends of the carrier and the feed rolls nearest thereto to continuously support the band or film at points intermediate of said carrier ends and feed rolls to prevent movement of said band or film upon the carrier during the movement of said carrier in one direction while the feed rolls are not moving, substantially as described.

89. In apparatus for exhibiting pictures a supporting frame, a carrier movable upon said frame to support a picture bearing band or film, mechanism to move said carrier, a picture bearing band or film to be supported by the carrier, compensating rolls mounted in movable supports to maintain the band or film in position upon the carrier, and means controlled by the movement of the carrier to control the position of the compensation rolls, substantially as described.

90. In apparatus for exhibiting pictures a supporting frame, a reciprocating carrier mounted to move upon said frame to support a picture bearing band or film, a device to move carrier in opposite directions, a picture bearing band or film, means to move said band or film to and upon the carrier to expose a picture thereon, movable supports to maintain a like distance between the opposite ends respectively of the carrier and the film supporting rolls upon the frame, and means controlled by the carrier to determine the position of the movable film supports, substantially as described.

91. In apparatus for exhibiting pictures a reciprocating carrier to support a picture bearing band or film, rollers journaled in the frame of the apparatus and connected to be turned to move said picture bearing band or film to and upon the carrier, a picture bearing surface supported upon said rollers to be moved thereby and extending thence to and about the carrier, and means comprising a tension roller mounted in the connected ends of pairs of links of equal length the opposite ends of each pair of which are pivoted to the opposite ends of the carrier and the picture bearing band or film moving rollers respectively, substantially as described.

92. In apparatus for exhibiting pictures and in combination a reciprocating carrier to support a picture bearing band or film, rollers mounted to turn in supports upon each end of said carrier, rollers journaled in the frame of the apparatus to support and move the picture bearing band or film to and upon the carrier, a tension roller mounted to be maintained equidistant from the end of the reciprocating carrier and one of the band or film moving rollers at each end of said reciprocating carrier to maintain the picture bearing band or film in proper position on said carrier, and pairs of links of even length connected respectively to the journals of the band or film moving rollers and rollers upon the opposite ends of the carrier and extending thence to receive and support the journals of each of the tension rollers which are arranged intermediate of said band or film moving rollers and rollers upon the carrier, substantially as described.

93. The combination in apparatus for exhibiting pictures of a reciprocating carrier to support a picture bearing band or film, rollers actuated by the carrier to support and move said picture bearing band or film to and upon said carrier, and a picture bearing band or film supported upon said rollers and extending thence to and about the carrier, with spring pressure rollers which bear upon the picture band or film to hold the same in close contact with the feed rollers which move such band or film, substantially as described.

94. In apparatus for exhibiting pictures a reciprocating carrier to support a picture bearing band or film, said picture bearing band or film, and means controlled by said carrier to move said surface to and upon said carrier, in combination with a shutter having an opaque section connected to cover a picture upon said picture bearing band or film during the interval of substitution of said picture for the picture which immediately preceded it at a predetermined point of exposure, substantially as described.

95. A picture bearing band or film, a carrier therefor to be moved and to move said band or film, means to move said carrier at a predetermined speed in one direction and at a highly increased speed in the opposite direction, and means to hold the band or film from movement upon the carrier during the movement of said carrier at such increased speed and simultaneously therewith to hold said band or film from movement upon its feed rolls, substantially as described.

96. A picture bearing band or film, a carrier therefor to be moved and to move said band or film, means to move said carrier in one direction at a predetermined speed and in the opposite direction at a highly increased speed, means to move the band or film to and upon the carrier in direction opposite that in which said carrier is moving during the movement of said carrier at such predetermined speed, and means to hold said band or film from movement upon the carrier during the movement of said carrier in opposite direction, substantially as described.

97. A picture bearing band or film, a reciprocating carrier to be moved and to move said band or film, a device to move said carrier, means to move said band or film to and upon the carrier in direction opposite that in which the carrier is moving during the movement of said carrier in one direction, and independent means to hold said band or film upon the carrier without movement thereon during the movement of said carrier in the opposite direction, substantially as described.

98. A picture bearing band or film, a carrier therefor to be moved and to move said band or film to expose a picture thereupon, feed rolls to move said band or film upon and from the carrier, a device common to each of said feed rolls to move the same in synchronism, and means to impart intermittent motion to said feed roll moving device, substantially as described.

99. A picture bearing band or film, a reciprocating carrier to move said band or film to expose a picture thereupon, feed rolls to move said band or film to and upon and from the opposite ends respectively of the carrier, a device common to each of said feed rolls to move the same in synchronism, and connections operated by the carrier to move the feed roll actuating device, substantially as described.

100. A picture bearing band or film, a reciprocating carrier to move said band or film to expose a picture thereupon, means to move said carrier in opposite directions, feed rolls to move said band or film upon and from the opposite ends respectively of the carrier, a device common to each of the feed rolls to move the same in synchronism, connections operated by the carrier to move the feed roll actuating device during the movement of the carrier in one direction, and means independent of the carrier to hold the feed rolls stationary during the movement of the carrier in opposite direction, substantially as described.

101. In apparatus for exhibiting pictures the combination of a continuously reciprocating carrier, a device to move said carrier, a picture bearing band or film, intermittently actuated feed rollers to move said band or film, a device common to each of said feed rollers to insure synchronism of movement therebetween, and means to positively move the feed roller actuating device by the carrier during the movement of said carrier in one direction, substantially as described.

102. In apparatus for exhibiting pictures the combination of a continuously reciprocating carrier, a device to move said carrier in one direction at one speed and in the opposite direction at another speed, an intermittently moving picture bearing band or film, a device controlled by the carrier to positively move the picture bearing band or film forward during the movement of the carrier in one direction and to hold the band or film from forward movement during the movement of the carrier in the opposite direction, substantially as described.

103. In apparatus for exhibiting pictures the combination of a continuously reciprocating carrier, an intermittently moving band or film to be supported by said carrier, means actuated by said carrier to move the band or film to and upon the carrier during its movement in one direction, means to alternately reciprocate said carrier in direction opposite to that in which the band or film is moved at a speed equal to that of said band or film and in direction like unto that in which said band or film is moved at a uniformly accelerated speed, substantially as described.

104. In apparatus for exhibiting pictures the combination with a picture bearing band or film, intermittently actuated feed rollers for moving said band or film, and means for imparting synchronism of movement to said feed rollers, of a reciprocating carrier to and over which and across the axis of a lens a looped portion of the band or film is guided and moved, and means for alternately reciprocating said carrier in direction opposite that in which the band or film is moved at a speed equal to that of said band or film and in direction like unto that in which said band or film is moved at a uniformly accelerated speed, substantially as described.

105. In apparatus for exhibiting pictures the combination with a picture bearing band or film, intermittently actuated feed rollers for moving said band or film, and means for actuating said feed rollers in synchronism, of a reciprocating carrier over which and across the axis of a lens a looped portion of the band or film is guided and moved, means for alternately reciprocating the carrier in the direction opposite that in which the band or film is moved at a speed equal to the speed of said band or film and in direction like unto that in which said band or film is moved at a uniformly accelerated speed, and means for holding the band or film from movement upon the carrier during the movement of said carrier at such accelerated speed, substantially as described.

106. A picture bearing band or film, feed rolls to move the band or film to and upon a carrier, a carrier to support the band or film, a device to move the carrier in one direction at one speed and in the opposite direction at uniformly accelerated speed, means controlled by the carrier to rotate the feed rolls during the period of its slowest movement to move said band or film with like surface speed to itself to expose a picture at a predetermined point, and means to hold said feed rolls from rotation and the band or film from movement upon the carrier during the period of its accelerated movement to substitute picture for picture at the point of exposure, substantially as described.

107. In apparatus for exhibiting pictures a movable carrier to support and carry a picture bearing band or film, a device to reciprocate said carrier in opposite directions with unequal speed, means to move said band or film to and upon the carrier to expose a picture thereupon at a predetermined point, means to hold the band or film substantially immovable at the point of exposure during the period of such exposure, and means to quickly move the band or film to substitute picture for picture at such point of exposure, substantially as described.

In testimony whereof I hereto affix my signature in presence of two witnesses.

WILLIAM H. H. KNIGHT.

Witnesses:
JAMES E. HOFFMAN, Jr.,
LOUISE R. LIVEZEY.